(12) United States Patent
Yabushita et al.

(10) Patent No.: US 6,445,665 B2
(45) Date of Patent: *Sep. 3, 2002

(54) DISC CENTERING MECHANISM IN DISC PLAYBACK AND/OR RECORDING APPARATUS

(75) Inventors: Yuichi Yabushita, Kanagawa; Masanori Hayashi, Chiba, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/008,680

(22) Filed: Jan. 16, 1998

(30) Foreign Application Priority Data

Jan. 20, 1997 (JP) .............................. 9-008025

(51) Int. Cl.⁷ .............................................. G11B 33/02
(52) U.S. Cl. ...................... 369/77.1; 369/75.2
(58) Field of Search .............................. 369/77.1, 77.2, 369/75.1, 75.2

(56) References Cited

U.S. PATENT DOCUMENTS

| | | | | |
|---|---|---|---|---|
| 4,498,162 A | * | 2/1985 | Schatteman | 369/77.1 |
| 4,979,160 A | * | 12/1990 | Araki | 369/75.2 |
| 5,226,028 A | | 7/1993 | Yamada et al. | 369/77.1 |
| 5,260,925 A | * | 11/1993 | Camps et al. | 369/77.1 |
| 5,719,844 A | * | 2/1998 | Abe | 369/77.1 |

FOREIGN PATENT DOCUMENTS

| | | | | |
|---|---|---|---|---|
| EP | 0 294 884 A1 | 12/1988 | | G11B/23/03 |
| EP | 0 331 663 A2 | 9/1989 | | G11B/17/028 |

* cited by examiner

*Primary Examiner*—Ario Etienne
*Assistant Examiner*—Tod Kupstas
(74) *Attorney, Agent, or Firm*—Oblon, Spivak, McClelland, Maier & Neustadt, P.C.

(57) ABSTRACT

Two pairs of, i.e., four, centering shafts are provided so as to move in synchronism with each other in opposite directions that are perpendicular to the pull-in direction of a disc and parallel with the recording surface of the disc. The centering shafts butt the outer periphery of the disc and thereby center it.

22 Claims, 41 Drawing Sheets

DISC CENTERING MECHANISM IN DISC PLAYBACK AND/OR RECORDING APPARATUS

BACKGROUND OF THE INVENTION

The present invention relates to a novel disc centering mechanism in a disc playback and/or recording apparatus. More specifically, the invention relates to a technique for increasing the positioning accuracy of centering of a disc shaped recording medium and enabling its use in what is called a vertical installation state.

In conventional disc playback and/or recording apparatuses, a disc is centered by means of two centering shafts.

FIGS. 1–4 outline such a conventional centering mechanism.

The centering mechanism has two swing arms 1 and 2 that swing in opposite directions in synchronism with each other, and centering shafts 3 and 4 are supported by the swing arms 1 and 2 at their tip portions. A resilient means (not shown), which is provided between the swing arms 1 and 2, provides turning force that urges the tip portions of the swing arms 1 and 2 in such directions as to cause the swing arms 1 and 2 to come closer to each other. And a stopper means (not shown) causes the swing arms 1 and 2 to stand by at the positions shown in FIG. 1.

A disc 100 is pulled into the apparatus by a pull-in roller 5 (see FIG. 2).

When the disc 100 is pulled into the apparatus, first the outer periphery of the recording medium 100 butts against the two centering shafts 3 and 4 that are in the stand-by state (see FIGS. 1 and 2) as shown in FIG. 3. When the disc 100 is further pulled in, its outer periphery pushes the two centering shafts 3 and 4, to turn the swing arms 1 and 2 against the turning force provided by the resilient means, whereby the disc 100 is pulled in to a predetermined pull-in completion position (see FIG. 4). At this time, the disc 100 is centered in such a manner that its outer periphery is pressed against the centering shafts 3 and 4 at two locations. When the disc 100 has been pulled in to the pull-in completion position (see FIG. 4), the pull-in completion is detected by a sensor (not shown), whereupon the rotation of the pull-in roller 5 is stopped and the pull-in roller 5 goes away from the disc 100. The disc 100 is then chucked by a chucking means (not shown).

By the way, in the conventional disc playback and/or recording apparatus, the disc 100 is centered in such a manner that its outer periphery butts the centering shafts 3 and 4 after it is pulled into the apparatus by the pull-in roller 5. Therefore, there may occur a case that the disc 100 is not in a proper positional relationship with the pull-in roller 5 at a time point when it starts to be pulled in by the pull-in roller 5. In particular, when the disc 100 is used in a vertical installation state, that is, when it is used in a state that its recording surface is parallel with the vertical direction, the positioning accuracy of the centering tends to be low and even erroneous chucking may occur.

A central portion of the pull-in roller 5 is constricted so as to prevent its outer circumferential surface from contacting the recording surface of the disc 100 and damaging the recording surface (see FIGS. 1–4). Therefore, if the center line of the disc 100 does not coincide with the center of the pull-in roller 5, the torque of the pull-in roller 5 does not equally act on the right and left portions of the disc 100, possibly causing a problem that the disc 100 is pulled in while being rotated.

The disc 100 that is pulled in while being rotated not only appears bad but also is rendered unstable inside the apparatus, possibly causing erroneous chucking.

SUMMARY OF THE INVENTION

An object of the present invention is therefore to increase the positioning accuracy of centering of a disc and to enable its use in what is called a vertical installation state.

Another object of the invention is to have a disc positioned correctly with respect to a pull-in roller at a time point when the pull-in roller starts to pull in the disc.

To attain the above objects, the invention provides a disc playback and/or recording apparatus having means for centering a disc, comprising a pair of centering members having a plurality of shafts and capable of moving in synchronism with each other in opposite directions that are perpendicular to the pull-in direction of a disc and parallel with the recording surface of the disc; and a driving mechanism for centering the disc by causing the outer periphery of the disc to butt the shafts.

In the above disc playback and/or recording apparatus of the invention, since the disc is centered by causing its outer periphery to butt the shafts (two pairs of, i.e., four, centering shafts), the centering can be effected with high accuracy. Further, even where the disc is used in a vertical installation state, it can be centered in a reliable manner.

Further, the invention provides a disc playback and/or recording apparatus comprising two positioning members that are separated from each other in a direction that is perpendicular to the pull-in direction of a disc and parallel with the recording surface of the disc and that are capable of moving in synchronism with each other in opposite directions in the above direction, wherein the disc is positioned in such a manner its outer periphery butts the positioning members.

In the above disc playback and/or recording apparatus of the invention, the disc can be positioned precisely.

BRIEF DESCRIPTION OF THE DRAWINGS

FIG. 3 is a conceptual plan view of the conventional centering mechanism in an intermediate state that the disc is pulled in;

FIG. 7 is a plan view of the centering mechanism in an intermediate state that the disc is pulled in;

DETAILED DESCRIPTION OF THE PREFERRED EMBODIMENTS

Figure 1:
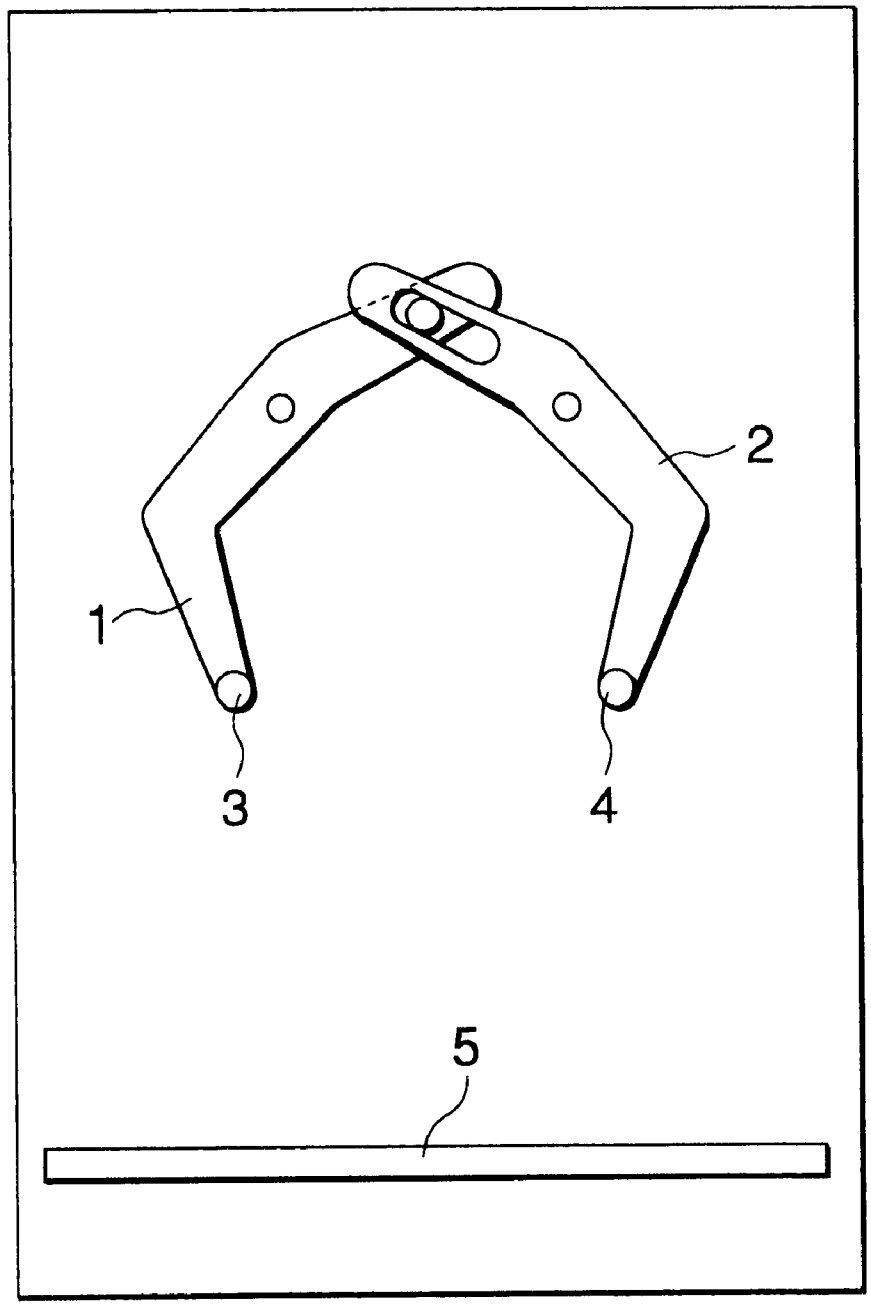
FIG. 1 is a conceptual view showing an example of a disc centering mechanism in a conventional disc playback and/or recording apparatus.
Figure 2:
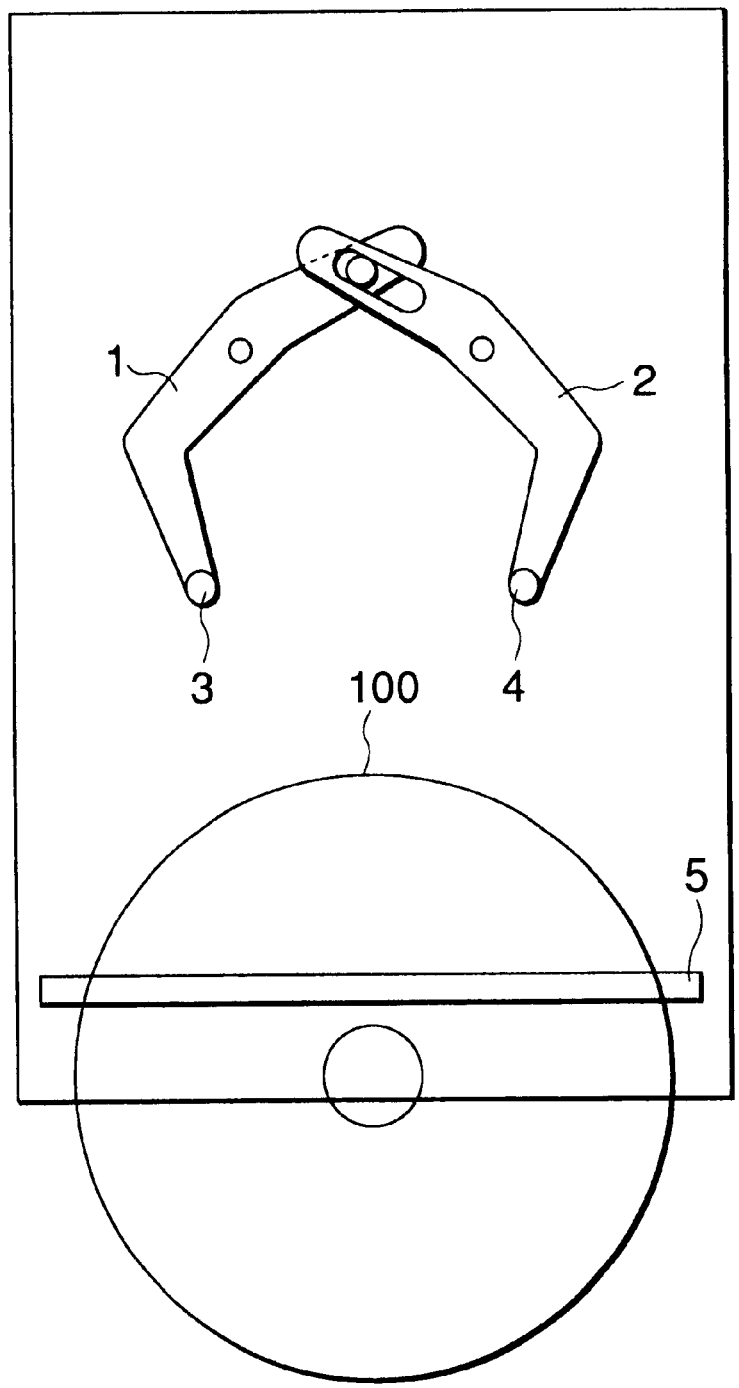
FIG. 2 is a conceptual plan view of the conventional centering mechanism in a state that insertion of a disc is started.
Figure 3:
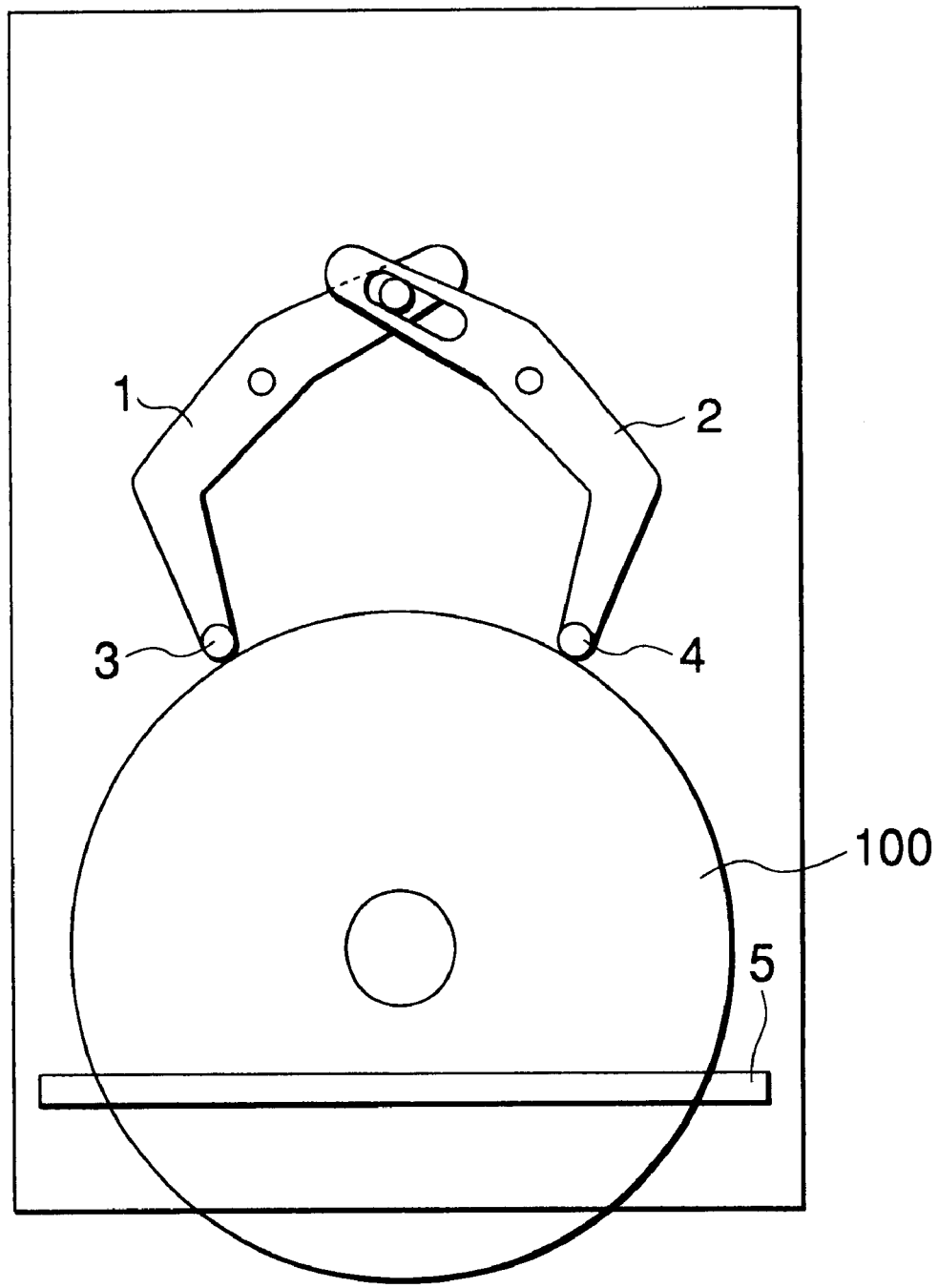
Figure 4:
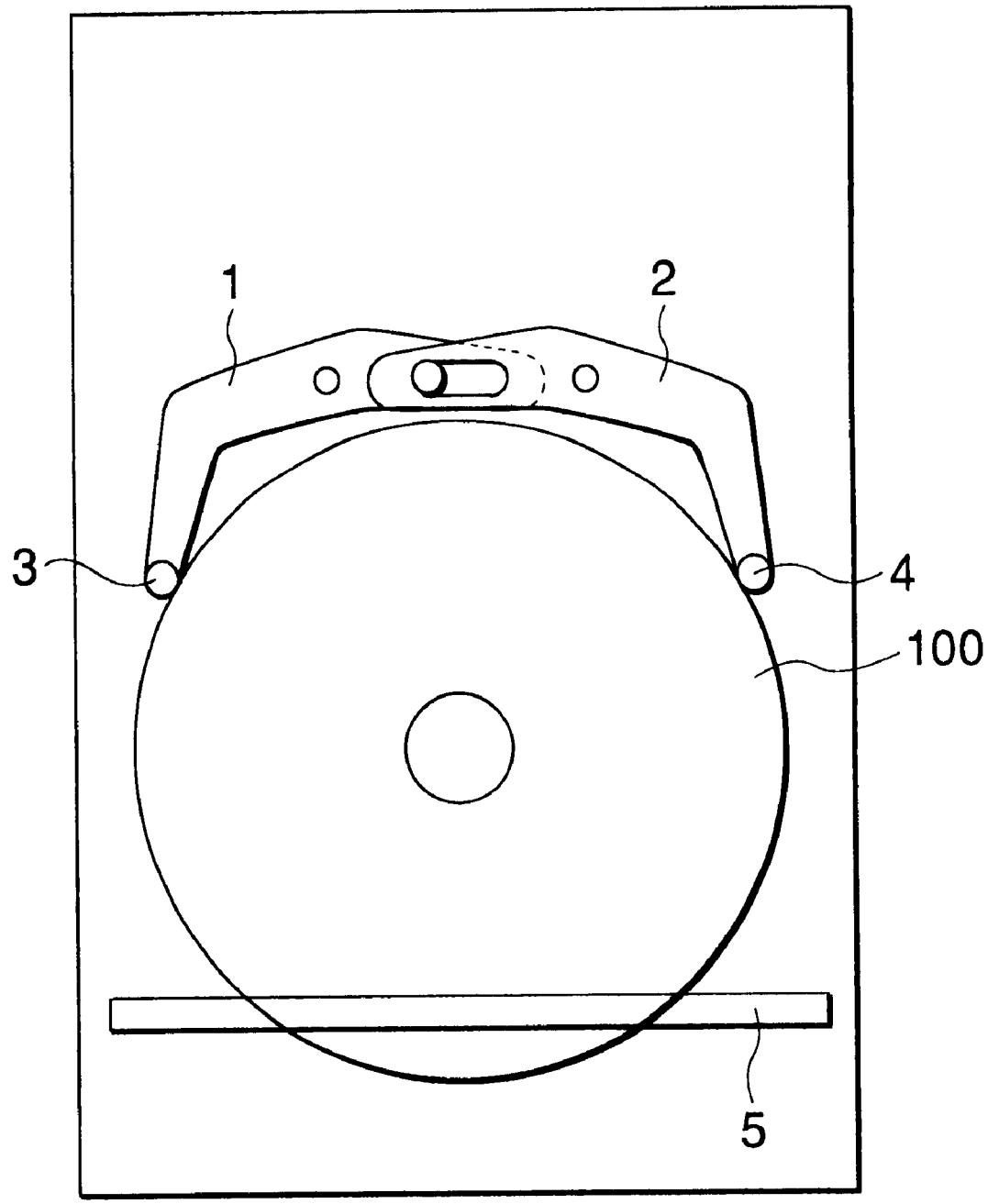
FIG. 4 is a conceptual plan view of the conventional centering mechanism in a state that the disc has been pulled into the apparatus and centered.
Figure 5:
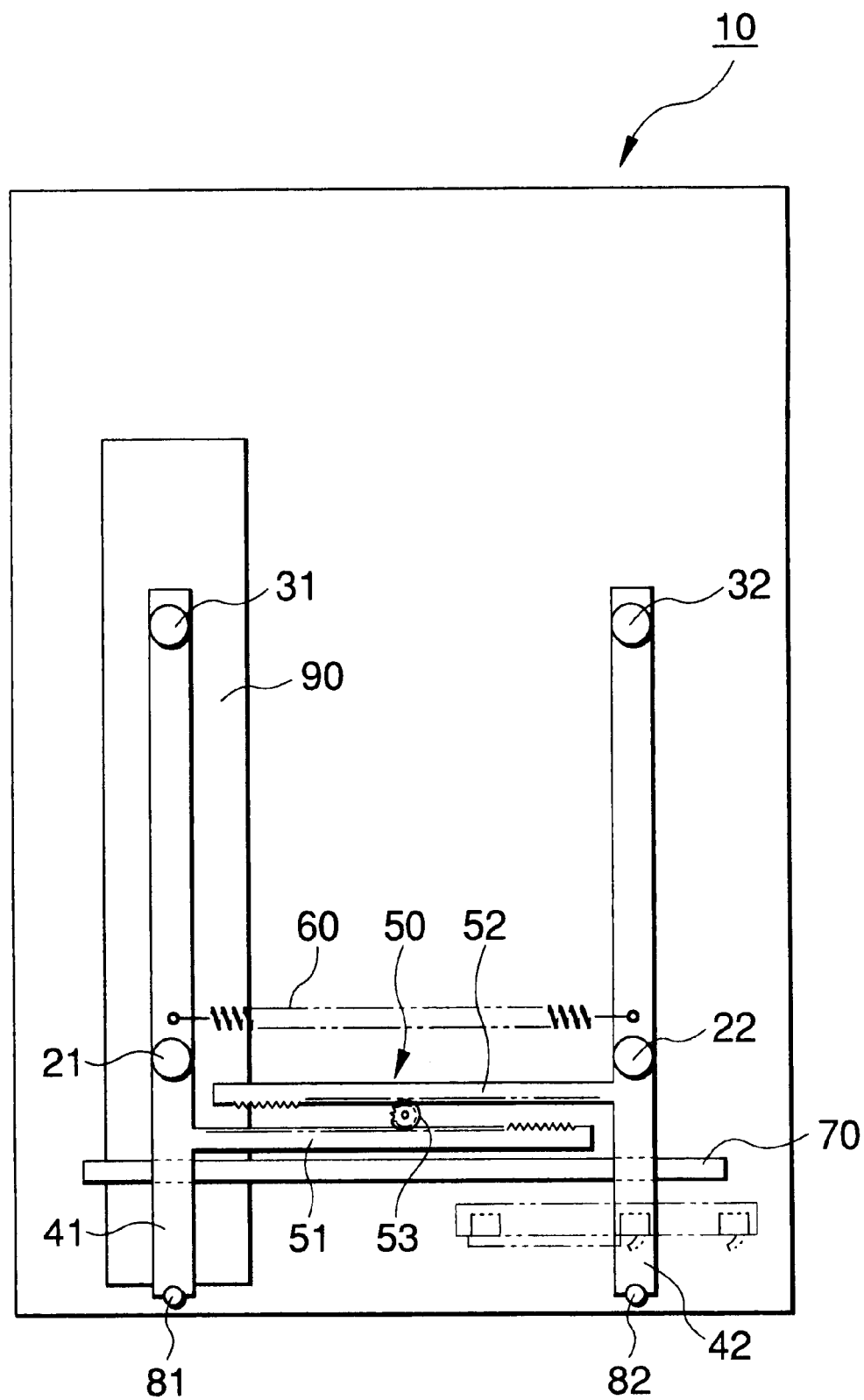
FIG. 5 is a plan view outlining a disc centering mechanism in a disc playback and/or recording apparatus according to the present invention.
Figure 6:
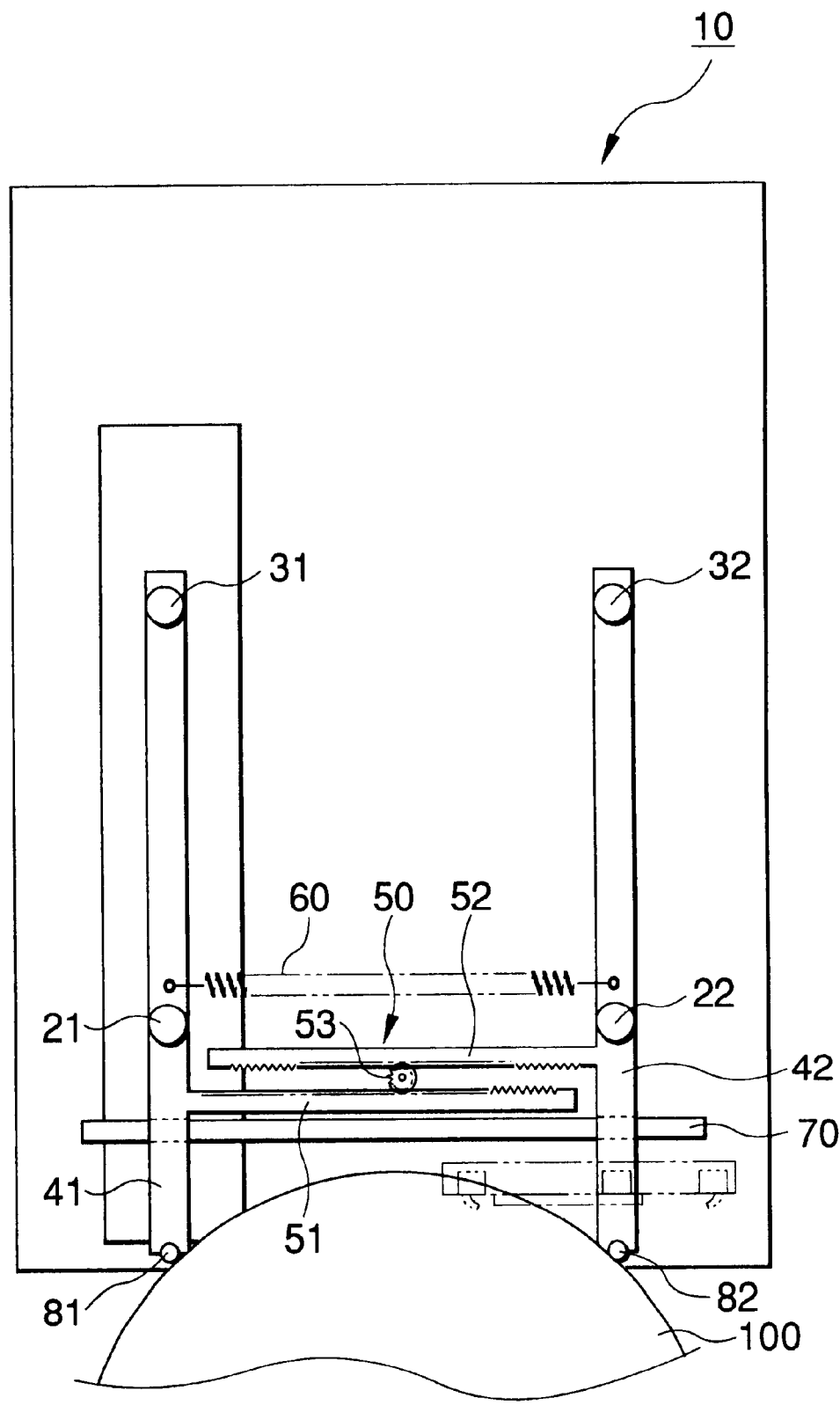
FIG. 6 is a plan view of the centering mechanism in a state that insertion of a disc is started.
Figure 7:
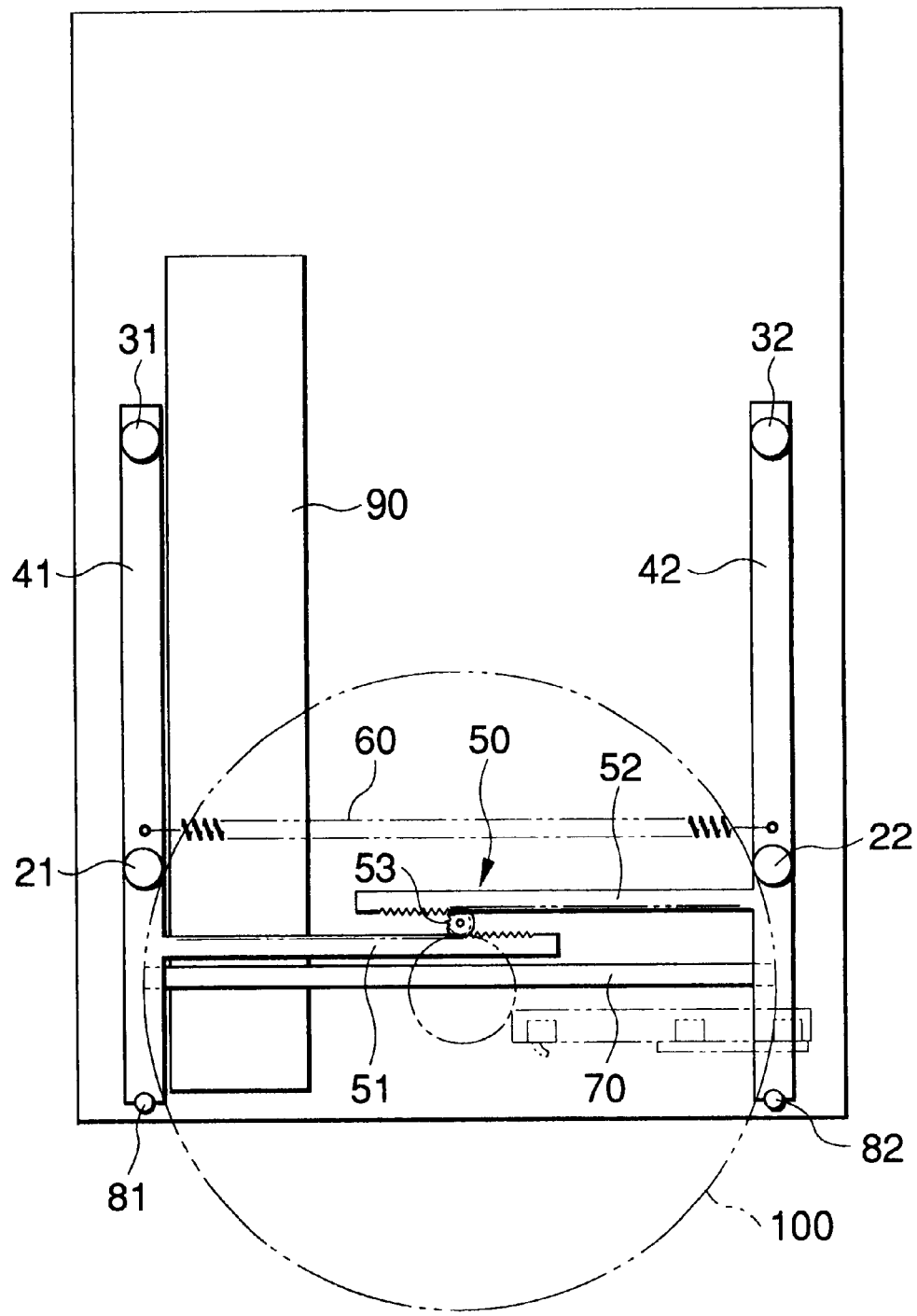

FIGS. 5–9 show a disc centering mechanism in a disc playback and/or recording apparatus according to an embodiment of the present invention.

A disc playback and/or recording apparatus 10 performs playback and/or recording on a disc 100, and may be an apparatus for performing only playback or recording. The disc 100 may be of various types such as CDs (compact discs) of 12 cm and 8 cm, a CD-R (compact disc-recordable), and a DVD (digital video disc).

The disc playback and/or recording apparatus 10 has two pairs of, i.e., four, centering shafts 21, 22, 31 and 32. The centering shafts 21 and 22 are disposed at a front-left position and a front-right position, respectively, and the centering shafts 31 and 32 are disposed at a rear-left position and a rear-right position, respectively.

In this specification, the directions are defined such that the right and left sides, the top and bottom sides, and the front and rear sides mean those when the disc playback and/or recording apparatus 10 is viewed with its front side (having an insertion mouth for input/output of the disc 100) is located on the viewer's side. These definitions also apply to the directions used in a specific embodiment that will be described later.

The four centering shafts 21, 22, 31, and 32 are supported by two centering members 41 and 42. Specifically, the centering shafts 21 and 31 are supported by the centering member 41 and the centering shafts 22 and 32 are supported by the centering member 42.

The centering members 41 and 42 are movable in the right-left direction, and a synchronizing means 50 is provided so as to allow the centering members 41 and 42 to move in opposite directions in synchronism with each other. The synchronizing means 50 consists of a rack 51 that projects from the centering member 41 toward the centering member 42, a rack 52 that projects from the centering member 42 toward the centering member 41, and a pinion gear 53. The pinion gear 53 is located between the two centering members 41 and 42, is rotatably supported by a supporting member (not shown), and meshes with both racks 51 and 52.

A resilient means 60 like a tension coiled spring is tensely provided between the two centering members 41 and 42, to provide moving force for urging the centering members 41 and 42 in such directions that they come closer to each other. In a state that no other force than the moving force by the resilient member 60 is applied to the centering members 41 and 42, they are held at stand-by positions shown in FIG. 6 by means of a stopper means (not shown).

A pull-in roller 70 is further provided in the vicinity of a disc insertion mouth (not shown) of the disc playback and/or recording apparatus 10. The pull-in roller 70 is made movable in the vertical direction.

Insertion detecting pins 81 and 82 are supported by the respective centering members 41 and 42 at their front end portions.

A cam slider 90 is further provided which is made movable in the front-rear direction.

Next, operations of pulling in and centering the disc 100 in the disc playback and/or recording apparatus 10 will be described.

When the disc 100 is inserted into the apparatus 10 through the insertion mouth (not shown), first the outer periphery of the disc 100 abuts the insertion detecting pins 81 and 82. As a result, the disc 100 is located at the center of the insertion path into the apparatus 10 (see FIG. 6).

When the disc 100 is inserted to a predetermined position, the pull-in roller 70 is rotated by a motor (not shown), whereby the disc 100 is pulled deep into the apparatus 10. In this process, first the outer periphery of the disc 100 butts and pushes the centering shafts 21 and 22 that are located on the front side, i.e., on the side of the insertion mouth, to exert moving force on the centering shafts 21 and 22 in such directions as to make them go away from each other. Thus, the moving force makes the two centering shafts 41 and 42 go away from each other against the tensile force of the resilient means 60 (see FIG. 7).

Figure 8:
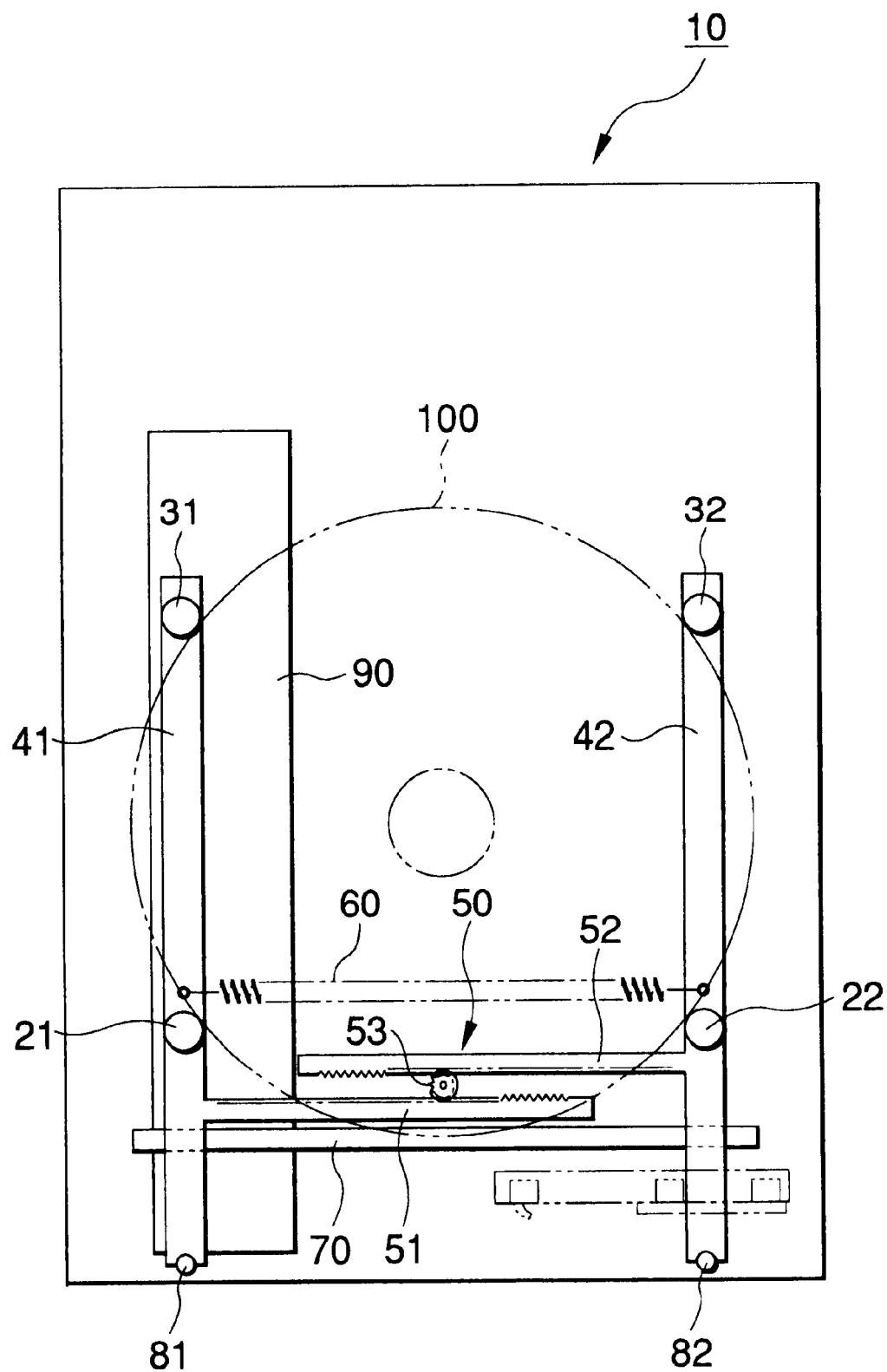
FIG. 8 is a plan view of the centering mechanism in a state that the disc has been pulled into the apparatus and centered.
Figure 9:
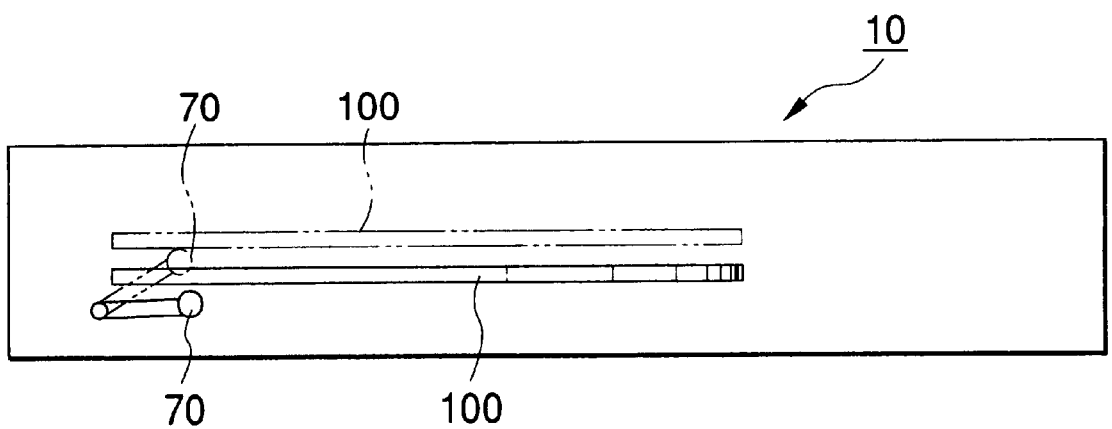
FIG. 9 is a side view showing how the disc that has been pulled in is then chucked.
Figure 10:
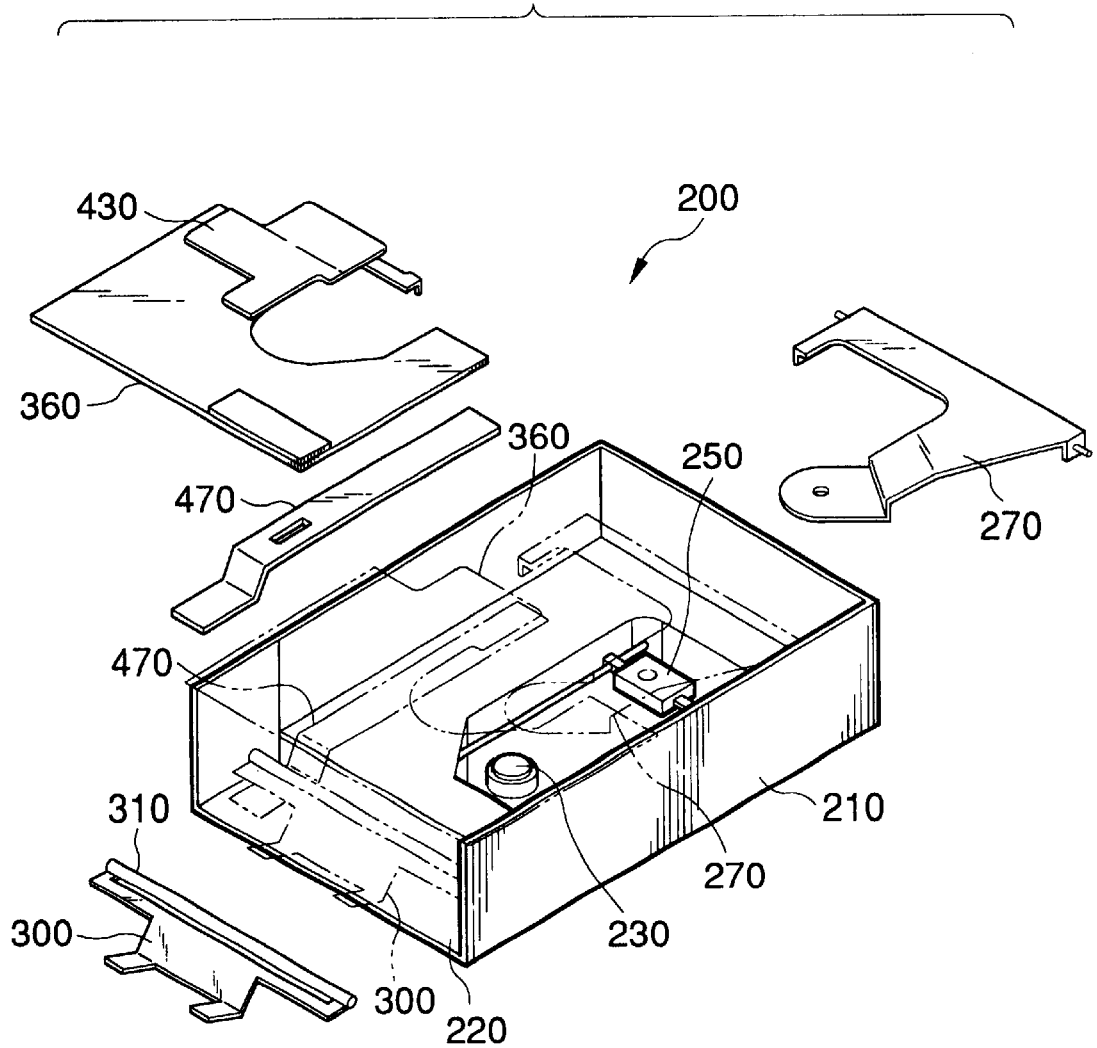
FIG. 10 shows a specific embodiment in which the invention is applied to a CD player, and is an exploded perspective view generally showing the entire configuration.

When the disc 100 has been pulled in to a pull-in completion position shown in FIG. 8, the motor that is rotating the pull-in roller 70 moves the cam slider 90 rearward. In association with this motion, the pull-in roller 70 descends, and a chucking mechanism (not shown) also descends and chucks the disc 100 between itself and a turn table (not shown). In the period from the descent and separation of the pull-in roller 70 from the disc 100 to the completion of chucking, the four centering shafts 21, 22, 31, and 32 resiliently butt the outer periphery of the disc 100 to center it (see FIGS. 8 and 9).

The cam slider 90 continues to retreat for a little while from the completion of chucking, whereby the centering shafts 21, 22, 31, and 32 are slightly separated from the outer periphery of the disc 100.

In the above manner, the disc 100 is loaded.

Playback or recording on the disc 100 is finished, it is ejected from the disc playback and/or recording apparatus 10 in the following manner.

The above-mentioned motor (not shown) is rotated in the direction opposite to the direction during the loading operation, to move the cam slider 90 toward the front side, whereby the four centering shafts 21, 22, 31, and 32 butt the outer periphery of the disc 100. The pull-in roller 70 is then elevated to contact the disc 100, whereupon the rotation of the pull-in roller 70 moves the disc 100 toward the insertion mouth. The motor is stopped at a time point when a part of the disc 100 projects from the apparatus 10 through the insertion mouth. The ejection of the disc 100 is completed by gripping its part that is projected from the insertion mouth and pulling it out of the apparatus.

As described above, the disc centering mechanism in the disc playback and/or recording apparatus according to the invention can perform a highly accurate centering operation because the centering is effected by causing the two pairs of, i.e., four, centering shafts 21, 22, 31, and 32 to butt the outer periphery of the disc 100. Further, the disc 100 can be centered reliably even in a case where it is used in what is called a vertical installation state.

The invention will be described in more detail by using a specific embodiment of a disc centering mechanism in a disc playback and/or recording apparatus.

FIGS. 10–39 show a disc centering mechanism in a disc playback and/or recording apparatus according to the specific embodiment of the invention, in which the invention is applied to a CD centering mechanism in what is called a compatible CD player, i.e., a CD playback apparatus capable of selectively playing back two kinds of CDs having different sizes, for instance, a 12-cm CD 101 and a 8-cm CD 102. But this does not mean that the disc centering apparatus in a disc-shaped playback and/or recording apparatus is not limited to the CD centering mechanism in a CD player. It goes without saying that the invention can be applied to a centering mechanism in a playback apparatus, a recording apparatus, or playback and recording apparatus of a DVD (digital video disc), a CD-R, or the like.

A CD player 200 has a base chassis 210 made of plastic, which supports most of the necessary members. The base chassis 210 is shaped like a flat box that is open on the top and front sides. An auxiliary chassis 220 made of metal and shaped like a concave that is long in the right-left direction as viewed from the front side is connected to the base chassis 210.

A turn table 230 that is driven by a motor is fixed to a bottom plate 211 of the base chassis 210 at a position a little closer to the front side than the center is.

The bottom plate 211 of the base chassis 210 supports the four corners of a pickup base 240 shaped like a generally rectangular frame via dampers (not shown). An optical pickup 250 is supported by the pickup base 240 so as to be movable in the front-rear direction. The optical pickup 250 is made movable in the front-rear direction by a pickup moving mechanism 260.

A chucking mechanism 270, which is provided on the base chassis 210, consists of a swing base 280 and a chuck plate 290 that is rotatably supported by a swing end portion of the swing base 280.

Figure 12:
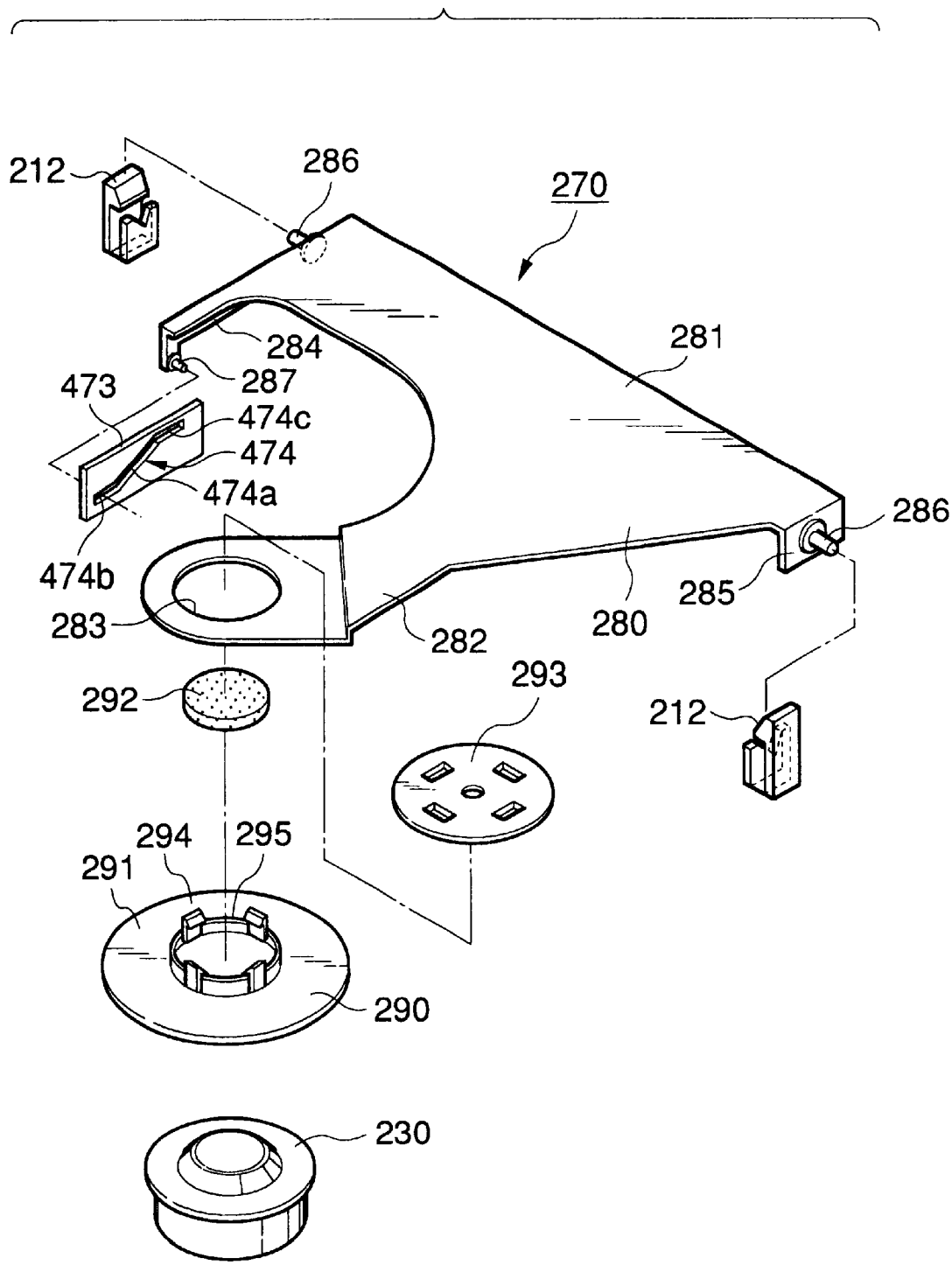
FIG. 12 is an exploded perspective view of a chucking mechanism.

As shown in FIG. 12, the swing base 280 has a proximal portion 281 that is wide in the right-left direction and a narrow support projection 282 that projects toward the front side from the proximal portion 281, and a support hole 283 is formed in a front end portion of the support projection 282. Left and right end portions 284 and 285 (the terms "left" and "right" are defined in a state that the CD player 200 is viewed from the front side) of the proximal portion 281 are bent downward, and the bent portions 284 and 285 are provided, at their rear end positions, with shafts 286 to be supported that project outward, respectively. The left end portion 284 is provided, at its front end position, a pin 287 to be controlled that project inward, i.e., toward the right side. The above-described swing base 280, specifically its shafts 286 to be supported, is rotatably supported by shaft supporting portions 212 that are provided on the base chassis 210 at its right and left end positions closer to the rear end.

The chuck plate 290 consists of a plastic press plate 291, a magnet 292, and a flange plate 293 made of sheet metal. The press plate 291 is an integral part consisting of a main portion 294 that is approximately disc-shaped and annular projection 295 that projects upward from a central portion of the main portion 294. The outside diameter of the projection 295 is made smaller than the diameter of the support hole 283 of the swing base 280. The flange plate 293 is fixed to a top portion of the projection 295 in a state that the projection 295 has been inserted into the support hole 283 of the swing base 280 from below. Since the flange plate 293 is shaped like a disc having an outside diameter larger than the diameter of the support hole 283 of the swing base 280, the press plate 291 is thus supported by the support hole 283 so as to be rotatable and movable within the support hole 283. The magnet 292 is approximately disc-shaped and fixed to a top portion of the press plate 291 in its projection 295.

Figure 13:
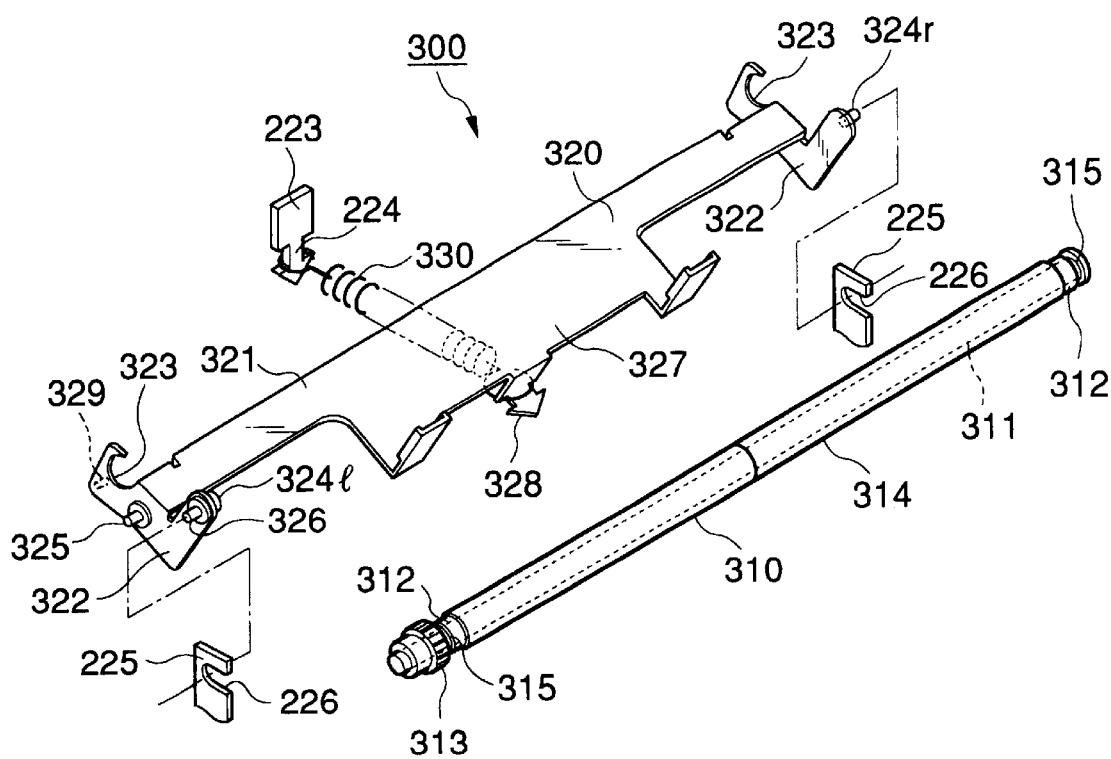
FIG. 13 is an exploded perspective view of a pull-in roller block.
Figure 14:
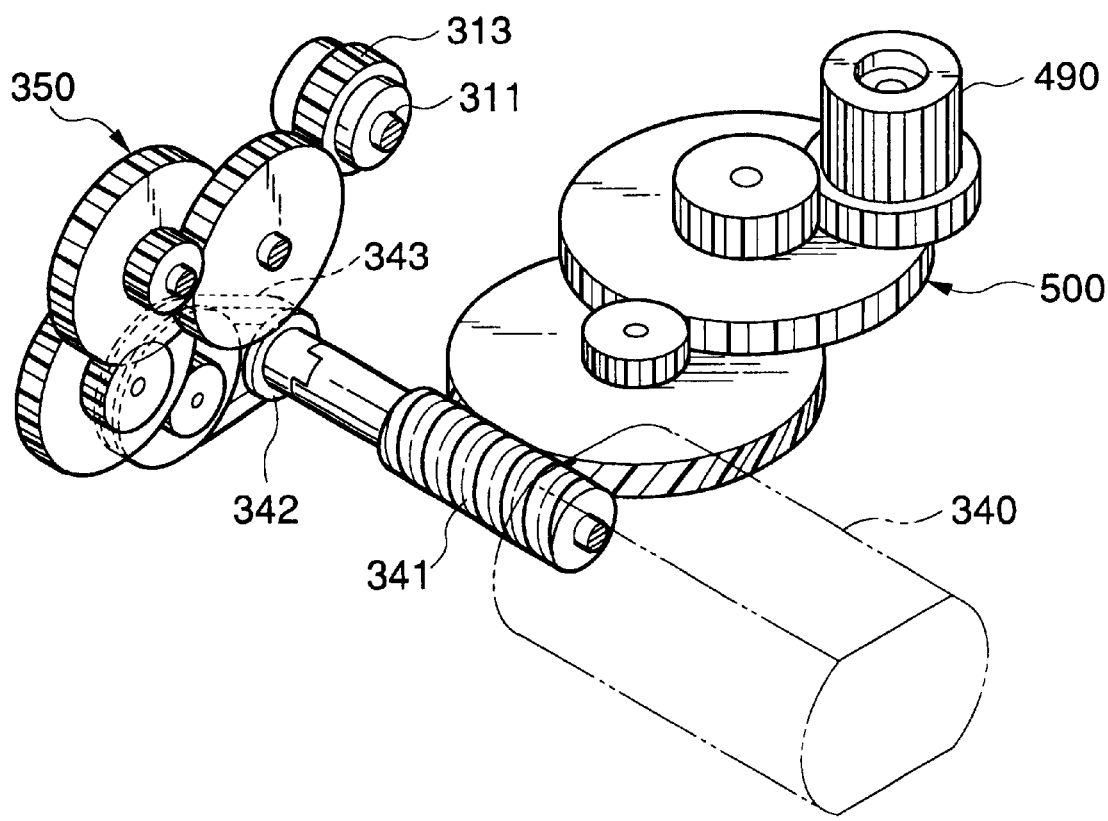
FIG. 14 is a perspective view of a roller gear train and a slider gear train.

A pull-in roller block 300, which is provided on the auxiliary chassis 220, consists of a pull-in roller 310 and a swing support plate 320 that rotatably supports the pull-in roller 310 as shown in FIG. 13.

The pull-in roller 310 consists of a shaft portion 311 that is long in the right-left direction, wheels 312 that are fitted in from the outside and fixed to both end portions of the shaft portion 311, a gear 313 that is fitted in from the outside and fixed to the left end of the shaft portion 311, and a rubber roller 314 that is fitted in from the outside and fixed to the shaft portion 311 except its right and left end portions. The rubber roller 314 is constricted at a central position in the right-left direction. The wheels 312 are formed with annular grooves 315, respectively.

The swing support plate 320 is made of sheet metal and has a T shape that is long in the right-left direction as viewed from the front side. Intermediate portions of arms 322 having an L shape that is somewhat inclined rearward as viewed from the left side are integrally connected to the right and left ends of a top portion 321 (long in the right-left direction) of the swing support plate 320, respectively. Bearing recesses 323 are formed in top portions of the respective arms 322. Each bearing recess 323 is open on the top-front side and the open portion is slightly narrower than the other portion. A shaft 324*l* to be supported projects inward from a tip portion of a projection (projecting toward the top-front side) of a bottom portion of the left-hand arm 322. A shaft 324r to be supported projects outward from a tip portion of a projection (projecting toward the top-front side) of a bottom portion of the right-hand arm 322. Support shafts 325 and 326 projects outward from the left-hand arm 322 at a central position and a bottom position, respectively. A spring hook piece 328 projects toward bottom-rear side from a bottom-center portion of a projection 327 that projects toward the bottom-front side from a central portion of the portion 321 of the swing support plate 320.

Further, a pin 329 to be controlled projects inward from an end portion, on the side opposite to the opening of the bearing recess 323, of the top portion of the left-hand arm 322.

The auxiliary chassis 220 has a rear half portion 221 that is lower than the bottom plate 211 of the base chassis 210 and a front half portion 222 that is approximately as high as the bottom plate 211. A projection wall 223, which projects from a rear-center portion of the rear half portion 221, is formed with a spring hook portion 224.

Shaft support pieces 225 project upward from the front half portion 222, at positions closer to its right and left ends, of the auxiliary chassis 220, and top portions of the respective shaft support pieces 225 are formed with cut-like shaft support portions 226 that are open on the front side.

With the above structure, the support shafts 324*l* and 324r that are provided on the arms 322 of the swing support plate 320 are rotatably engaged with the shaft support portions 226 that are formed in the top portions of the shaft support pieces 225 of the auxiliary chassis 220. And a tension coiled spring 330 is tensely provided between the spring hook piece 328 of the swing support plate 320 and the spring hook portion 224 of the auxiliary chassis 220, whereby clockwise rotational force (as viewed from the right side) is exerted on the swing support plate 320. A turn in this direction is stopped when the lower end of the portion 327 of the swing support plate 320 butts the top surface of the front half portion 222 of the auxiliary chassis 220 (see FIG. 27). The annular grooves 315 of the respective wheels 312 of the pull-in roller 310 are rotatably engaged with the bearing recesses 323 of the swing support plate 320, whereby both end portions of the pull-in roller 310 are rotatably supported by the top portions of the arms 322 of the swing support plate 320, respectively.

A loading motor 340 is disposed on the rear half portion 221 of the auxiliary chassis 220. A worm gear 341 is fixed to the rotary shaft of the loading motor 340, and a pulley 342 is formed so as to be integral with a left end portion of the worm gear 341. A belt 343 is wound on the pulley 342 and the input stage of a roller gear train consisting of a plurality of gears that are rotatably supported by the support shafts 325, 326, 228, etc. The final stage of the roller gear train 350 meshes with the gear 313 of the pull-in roller 310. Therefore, when the loading motor 340 is driven, the pull-in roller 310 is rotated via the roller gear train 350.

Figure 17:
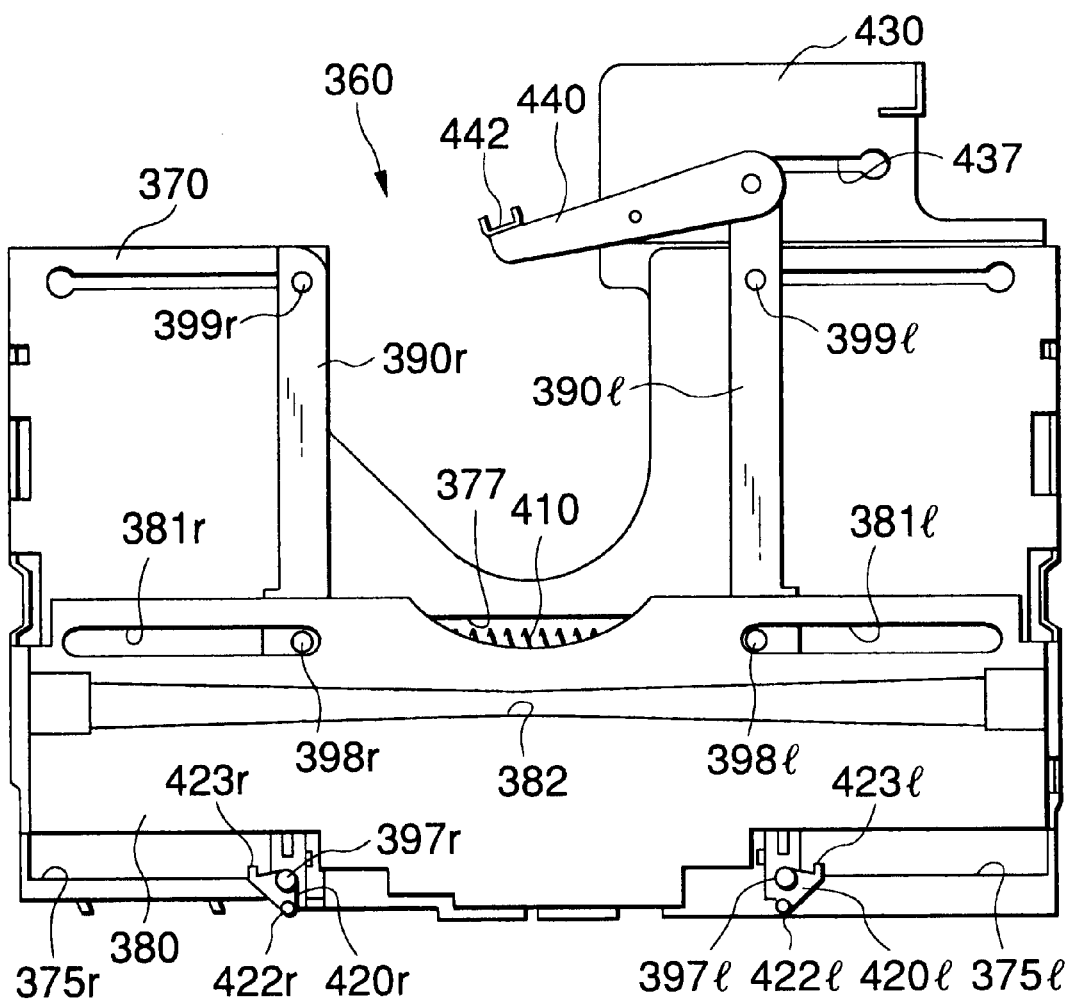
FIG. 17 is a bottom view of the centering block.
Figure 18:
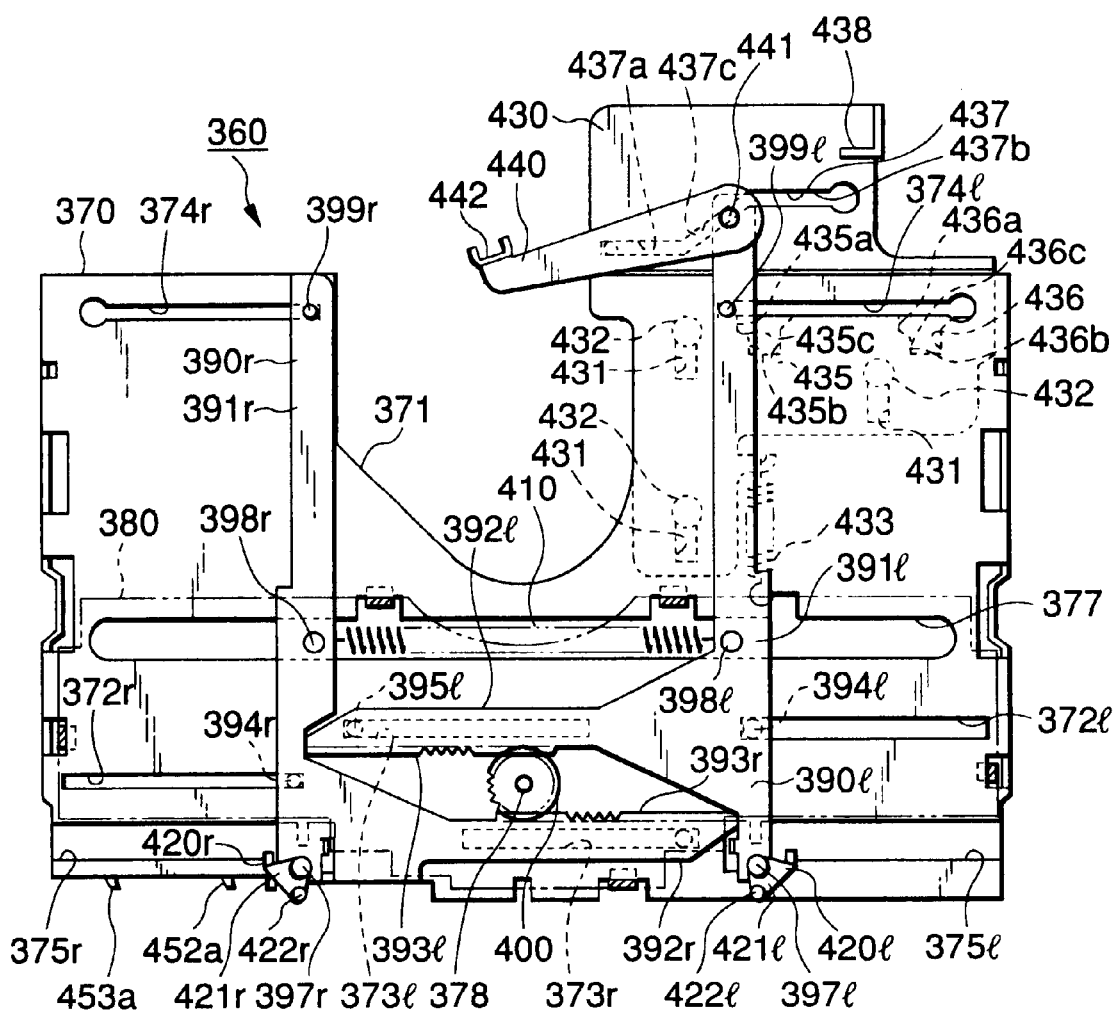
FIG. 18 is a bottom view of the centering block in a state that an auxiliary support substrate is removed.

A centering block 360 shown in FIG. 17 is placed on a top portion of the base chassis 210 except its rear portion.

The centering block 360 has a main support substrate 370 made of sheet metal and a plastic auxiliary support substrate 380 to be attached to the bottom surface side of the main support substrate 370.

The main support substrate 370 is generally shaped like a rectangle that is long in the right-left direction and has a cut 371 that is located in a central portion in the right-left direction and extends from a central position to the rear periphery in the front-rear direction.

The main support substrate 370 is formed with six guide slits 372*l*, 372r, 373*l*, 373r, 374*l*, and 374r that extend in the right-left direction. The guide slits 372*l*, 373*l*, and 374*l* are to guide movement of a left-hand centering member (described later) in the right-left direction. The guide slit 372*l* is formed at a left-side position closer to the front side, the guide slit 373*l* is formed at a position closer to the front end and a little closer to the right side than the center is, and the guide slit 374*l* is formed in a rear end portion at a left-side position. The guide slits 372r, 373r, and 374r are to guide movement of a right-hand centering member (described later) in the right-left direction. The guide slit 372r is formed at a right-side position closer to the front end, the guide slit 373r is formed at a position closer to the front end and a little closer to the left side than the center is, the guide slit 374r is formed in the rear end portion at a right-side position.

Further, escape elongated holes 375*l* and 375r that are long in the right-left direction are formed in left-side and right-side portions of a front end portion of the main support substrate 370. Cuts 376*l* and 376r are formed at the front peripheries of the respective escape elongated holes 375*l* and 375r on the center side. Further, an escape elongated hole 377 that is so long in the right-left direction as to almost covers the entire width of the main support substrate 370 is formed in the main support substrate at a position a little closer to the front side than the center is in the front-rear direction.

A support shaft 378 projects downward from a central portion of a front end portion of the main support substrate 370.

Two centering members 390*l* and 390r are supported by the main support substrate 370 so as to be movable in the rightleft direction. The centering members 390*l* and 390*r* have rack portions 392*l* and 392*r* that project toward each other from portions, closer to the front end, of main portions 391*l* and 391*r* that are long in the front-rear direction, respectively. The peripheries, opposed to each other, of the rack portions 392*l* and 392*r*, that is, the rear periphery of the rack portion 392*l* of the left-hand centering member 390*l* and the front periphery of the rack portion 392*r* of the right-hand centering member 390*r*, are formed with rack teeth 393*l* and 393*r*, respectively. A pin 394*l* to be guided that projects from the top surface, at a position closer to the front end, of the main portion 391*l* of the left-hand centering member 390*l* is slidably engaged with the above-mentioned guide slit 372*l*. A pin 395*l* to be guided that projects from the top surface of a tip portion of the rack portion 392*l* is slidably engaged with the above-mentioned guide slit 373*l*. A pin 396*l* to be guided that projects from the top surface of a rear end portion of the main portion 391*l* is slidably engaged with the above-mentioned guide slit 374*l*. Further, a pin 394*r* to be guided that projects from the top surface, at a position closer to the front end, of the main portion 391*r* of the right-hand centering member 390*r* is slidably engaged with the above-mentioned guide slit 372*r*. A pin 395*r* to be guided that projects from the top surface of a tip portion of the rack portion 392*r* is slidably engaged with the above-mentioned guide slit 373*r*. A pin 396*r* to be guided that projects from the top surface of a rear end portion of the main portion 391*r* is slidably engaged with the above-mentioned guide slit 374*r*.

Circular-rod-like insertion detecting pins 397*l* and 397*r* project downward from front end portions of the main portions 391*l* and 391*r* of the centering members 390*l* and 390*r*, respectively. Circular-rod-like centering shafts 398*l*, 398*r*, 399*l*, and 399*r* project downward from portions a little closer to the front side than the center is in the front-rear direction and from rear end portions of the main portions 391*l* and 391*r*, respectively.

A synchronizing pinion gear 400 is rotatably supported by a support shaft 378 of the main support substrate 370, and meshes with the rack portions 393*l* and 393*r* of the respective centering members 390*l* and 390*r*. Therefore, the two centering members 390*l* and 390*r* move at the same time in opposite directions in the right-left direction.

A tension coiled spring 410 is located in the above-mentioned escape elongated hole 377 of the main support substrate 370 and is tensely provided between the two centering members 390*l* and 390*r*. Therefore, the tension coiled spring 410 causes the centering members 390*l* and 390*r* to be located at position where they are closest to each other in a state that no other force is applied thereto.

Lock members 420*l* and 420*r* are supported by the main portions 391*l* and 391*r*, at their front end positions, of the respective centering members 390*l* and 390*r*. In the lock members 420*l* and 420*r*, one corner portions of main portions 421*l* and 421*r* that are planar and approximately triangular are rotatably supported by the insertion detecting pins 397*l* and 397*r* at their proximal positions, respectively. Circular-rod-like pins 422*l* and 422*r* to be pressed project downward from the main portions 421*l* and 421*r* at their front corner portions, respectively. Further, engagement pieces 423*l* and 423*r* project upward from the main portions 421*l* and 421*r* at their side corner portions, respectively. Torsion coiled springs 424*l* and 424*r* are provided between the engagement pieces 423*l* and 423*r* and the main portions 391*l* and 391*r* of the centering members 390*l* and 390*r*, respectively. The torsion coiled springs 424*l* and 424*r* exert counterclockwise rotational force (as viewed from above) on the left-hand lock member 420*l* and clockwise rotational force (as viewed from above) on the right-hand lock member 420*r*. Therefore, in a state that the two centering members 390*l* and 390*r* are closest to each other, the engagement pieces 423*l* and 423*r* of the lock members 420*l* and 420*r* are in engagement with the peripheries opposite to the centers of the cuts 376*l* and 376*r* of the escape elongated holes 375*l* and 375*r*, respectively. Therefore, in this state, the centering members 390*l* and 390*r* are prevented from moving in such directions as to go away from each other.

The auxiliary support substrate 380 has front-rear width that is approximately ⅓ of that of the main support substrate 370 and a lateral width that is approximately equal to that of the latter. The auxiliary support substrate 380 is attached to the bottom surface of the main support substrate 370, and the centering members 390*l* and 390*r* are accommodated in a thin space formed between the main support substrate 370 and the auxiliary support substrate 380.

Escape slits 381*l* and 381*r* are formed in a rear end portion of the auxiliary support substrate 380 at positions distant from each other in the right-left direction so as to extend in the right-left direction. The left-hand centering shaft 398*l* and the right-hand centering shaft 398*r* are inserted in the escape slits 381*l* and 381*r*, respectively. The bottom surface of the auxiliary support substrate 380 is formed with a recess 382 that extend in the right-left direction (see FIG. 17). The recess 382 is so shaped as to approximately conform to the top portion of the rubber roller 314 of the pull-in roller 310, that is, the recess 382 is so shaped that the top portion of the rubber roller 314 can go into it.

A mode slider 430 is supported so as to be slidable in the front-rear direction by a rear end portion of the top surface of the main support substrate 370 at a position on the left of the cut 371. The mode slider 430 is formed with three slits 431 to be guided extending in the front-rear direction. Three pins 432 projecting upward from the top surface of the main support substrate 370 are slidably engaged with the respective slits 431 to be guided, to render the mode slider 430 slidable within the length of the slits 431 to be guided. A tension coiled spring 433 is tensely provided between the mode slider 430 and the main support substrate 370, to exert forward moving force on the mode slider 430. As a result, in a state that no other force is applied to the mode slider 430, it is located at the front end of its movable range at which the rear ends of the slits 431 to be guided are in contact with the respective pins 432.

The mode slider 430 is formed with a slit 434 extending in the right-left direction. In a state that the mode slider 430 is located at the front end of its movable range, the slit 434 coextends with a guide slit 374*l* that is formed in the main support substrate 370 and a centering shaft 399*l* that is supported by the centering member 390*l* at a rear end position is inserted in the slits 434 and 374*l*. Escape cuts 435 and 436 are formed at the front periphery of the slit 434 at positions apart from each other in the right-left direction. As for the right-hand peripheries of the respective escape cuts 435 and 436, rear portions 435*a* and 436*a* are a little deviated from front portions 435*b* and 436*b* to the right and the rear portions 435*a* and 436*a* are connected to the 435*b* and 436*b* via slant portions 436*c* and 436*c*, respectively.

Further, the mode slider 430 is formed, at a rear end position, with a control slit 437 extending generally in the right-left direction. The control slit 437 consists of a right-hand portion 437*a*, a left-hand portion 437*b*, and an intermediate portion 437*c* that connects the two portions 437*a* and 437*b*. The right-hand portion 437*a* is closer to the front side than the left-hand portion 437a is and the intermediate portion 437c is inclined.

Further, a projection 438 projects downward from the mode slider 430 at the rear-left end.

A left end portion of a judgment lever 440 is rotatably connected to the rear end of the left-hand centering member 390l. A pin 441 to be controlled that projects upward from the judgment lever at an intermediate position is slidably engaged with the control slit 437 of the mode slider 430. A piece 442 to be pressed projects downward from the judgment lever 440 at the right end.

A switch substrate 450 is supported by the top surface of a right half portion of a front end portion of the main support substrate 370. Three push switches 451–453 are disposed on the switch substrate 450 so as to be spaced from each other in the right-left direction. Parts 451a–453a to be pressed of the respective push switches 451–453 somewhat project from the front periphery of the main support substrate 370. A switch pressing piece 460 that projects upward from the front periphery of the right-hand centering member 390r extends along the front periphery of the main support substrate 370. In a state that the centering members 390l and 390r are closest to each other, the left end portion of the switch pressing piece 460 pushes the part 451a to be pressed of the push switch 451 and its right end portion is located on the left of and adjacent to the part 452a to be pressed of the push switch 452.

The centering block 360 as described above is placed on a top portion of the base chassis 210 except its rear end portion. In the initial state in which neither the disc 101 (12-cm CD) or 102 (8-cm CD) is loaded, the rubber roller 314 of the pull-in roller 310 resiliently contacts the bottom surface of the auxiliary substrate 380 of the centering block 360; more specifically, a top portion of the rubber roller 314 is located in the recess 382.

A control slider 470 is supported by a left end portion of the top surface of the base chassis 210 so as to be slidable in the front-rear direction.

Figure 11:
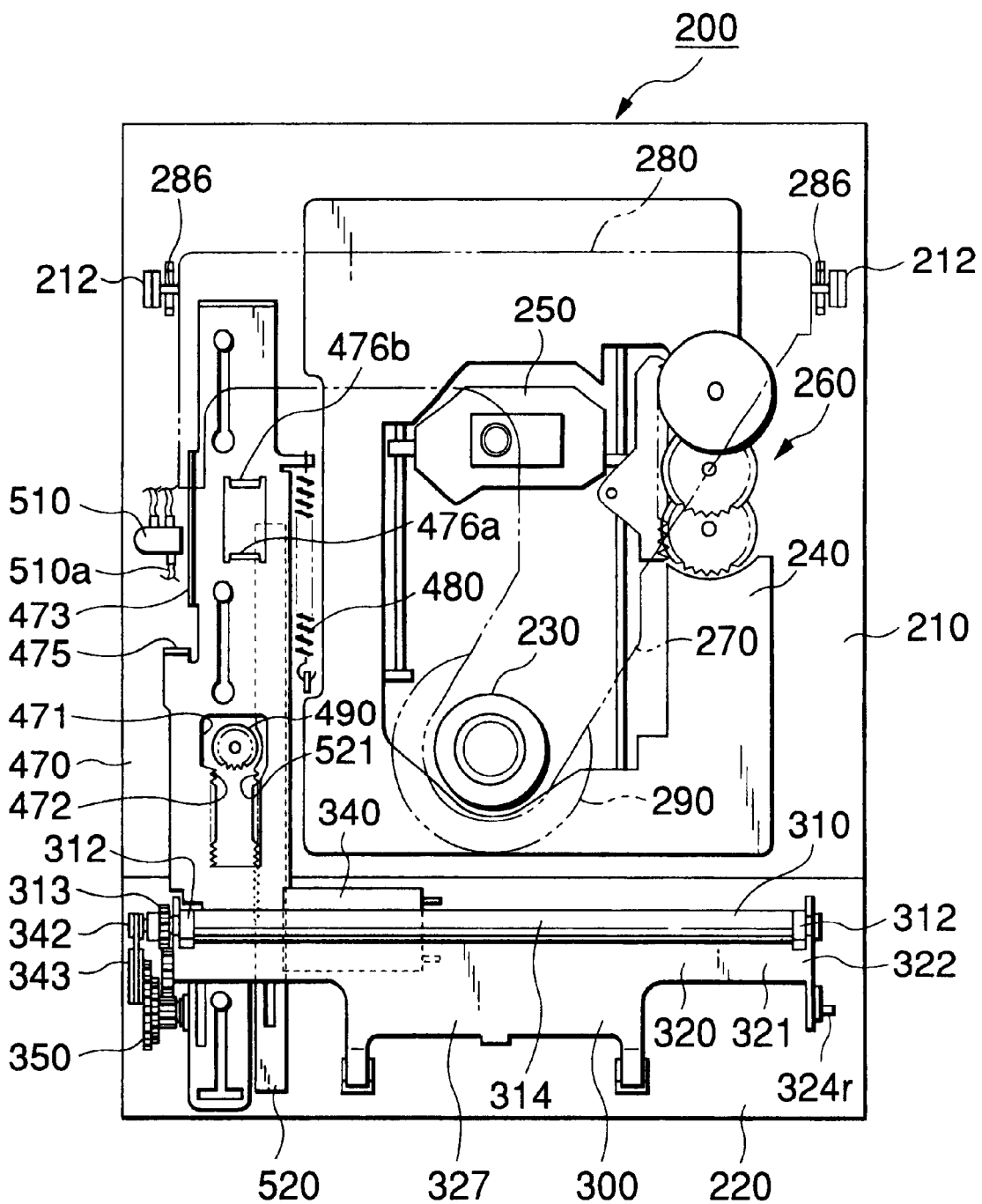
FIG. 11 is a plan view of the CD player in a state that a centering block is removed.
Figure 15:
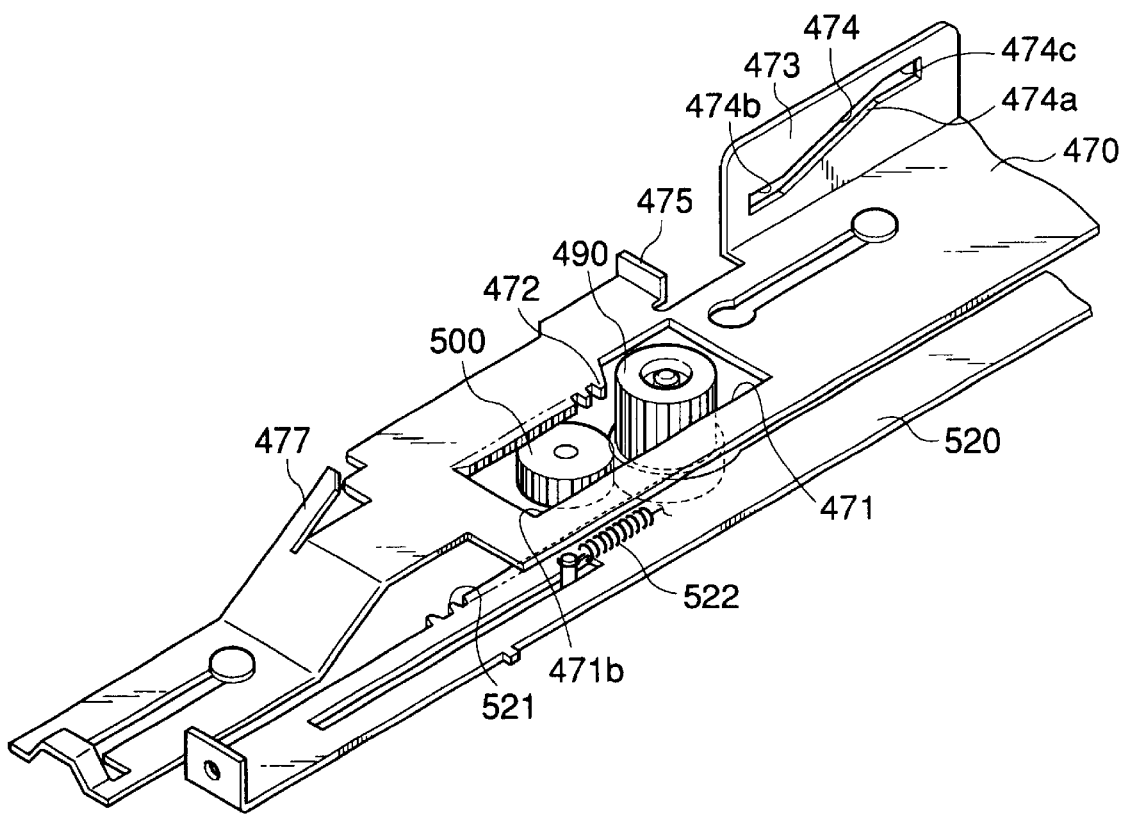
FIG. 15 is a perspective view of a control slider and a manual ejection lever.
Figure 16:
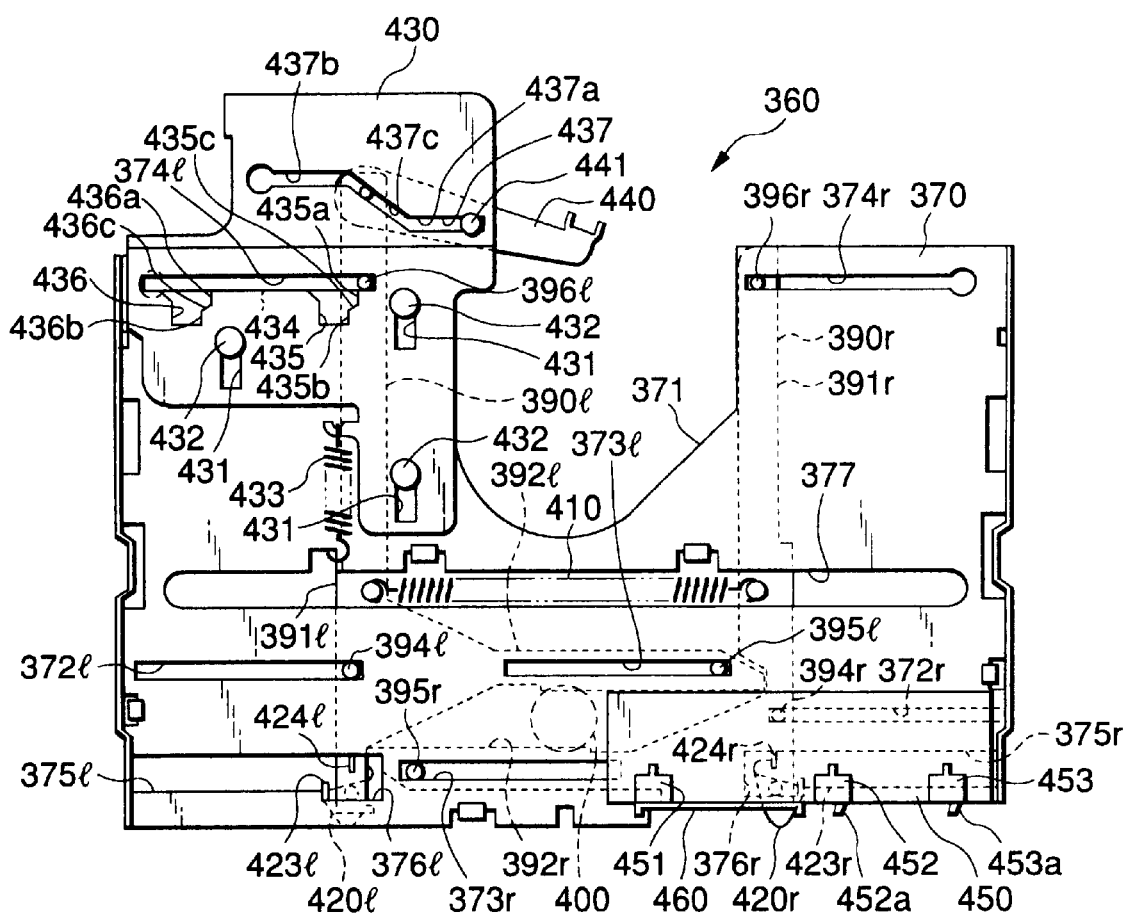
FIG. 16 is a plan view of the centering block.

As shown in FIGS. 11 and 15, the control slider 470 is formed with an elongated hole 471 that is long in the front-rear direction approximately at a central position. The elongated hole 471 has a rear end portion 471a that is wider in the lateral direction than the other portion 471b. The left-hand periphery of the portion 471b, i.e., the portion of the elongated hole 471 excluding the rear end portion 471a, is formed with rack teeth 472.

The left-hand periphery of the control slider 470 is formed with a cam piece 473 that is long in the front-rear direction at a position a little closer to the rear side than the center is. The cam piece 473 is formed with a cam slit 474 that extends generally in the front-rear direction. The cam slit 474 consists of a slant portion 474a whose height decreases toward the front side, a front horizontal portion 474b that is connected to the front end of the slant portion 474a and extends horizontally, and a rear horizontal portion 474c that is connected to the rear end of the slant portion 474a and extend horizontally. The pin 287 to be controlled (see FIG. 12) that is provided on the swing base 280 of the chucking mechanism 270 is slidably engaged with the cam slit 474.

A switch pressing piece 475 projects leftward from the left-hand periphery of the control slider 470 at a position a little distant from the front periphery of the cam piece 473 to the front side. Projections 476a and 476b project upward on the right of the cam piece 473 so as to be opposed to each other and separated from each other in the front-rear direction. A roller control piece 477 is inclined and projects rearward from the left-hand periphery of the control slider 470 at a position closer to the front side. In the initial state, the control slider 470 is located at the front end of its movable range and the rear end of the roller control piece 477 is opposed, from the front side, to the pin 329 to be controller of the swing support plate 320 of the pull-in roller block 300 (see FIG. 27).

A tension coiled spring 480 is tensely provided between the base chassis 210 and the control slider 470, and provides moving force for urging the control slider 470 toward the front side.

A pinion gear 490 is supported rotatably by the base chassis 210 so as to be located in the elongated hole 471 of the control slider 470. The pinion gear 490 is engaged with the worm gear 341 via the slider gear train 500, whereby the pinion gear 490 is rotated being driven by the loading motor 340. In a state that the control slider 470 is located at the front end of its movable range, the pinion gear 490 is located in the rear end portion 471a of the elongated hole 471 and is not in mesh with the rack teeth 472. If the control slider 470 slightly moves rearward from the above state, the pinion gear 490 comes to mesh with the rack teeth 472 of the control slider 470.

A push switch 510 is disposed on the top surface of a left end portion of the bottom plate 211 of the base chassis 210 approximately at a central position in the front-rear direction. A part 510a to be pressed of the push switch 510 projects to the front side, and is opposed, from the rear side, to the switch pressing piece 475.

A manual ejection lever 520 shaped like a plate that is long in the front-rear direction is supported by the top surface of the bottom plate 211 of the base chassis 210 at a position closer to the left end of the bottom plate 211 so as to be movable in the front-rear direction. The left-hand periphery of the manual ejection lever 520 is located on the right of and close to the pinion gear 490, and part of the left-hand periphery is formed with rack teeth 521 (see FIG. 15).

Usually, the tensile force of the tension coiled spring 522 that is tensely provided between the manual ejection lever 520 and the bottom plate 211 of the base chassis 210 causes the manual ejection lever 520 to be located at the front end of its movable range. If the front end portion of the manual ejection lever 520 is pushed rearward when necessary, the manual ejection lever 520 is moved rearward, whereby the rack teeth 521 come to mesh with the pinion gear 490 to rotate it in the unloading direction, i.e., counterclockwise when viewed from above. When the pinion gear 490 is rotated in the unloading direction, the worm gear 341 is rotated via the slider gear train 500 that is engaged with the pinion gear 490. The rotation of the worm gear 341 causes, via the roller gear train 350, the pull-in roller 310 in the unloading direction, i.e., clockwise when viewed from the left side.

Figure 19:
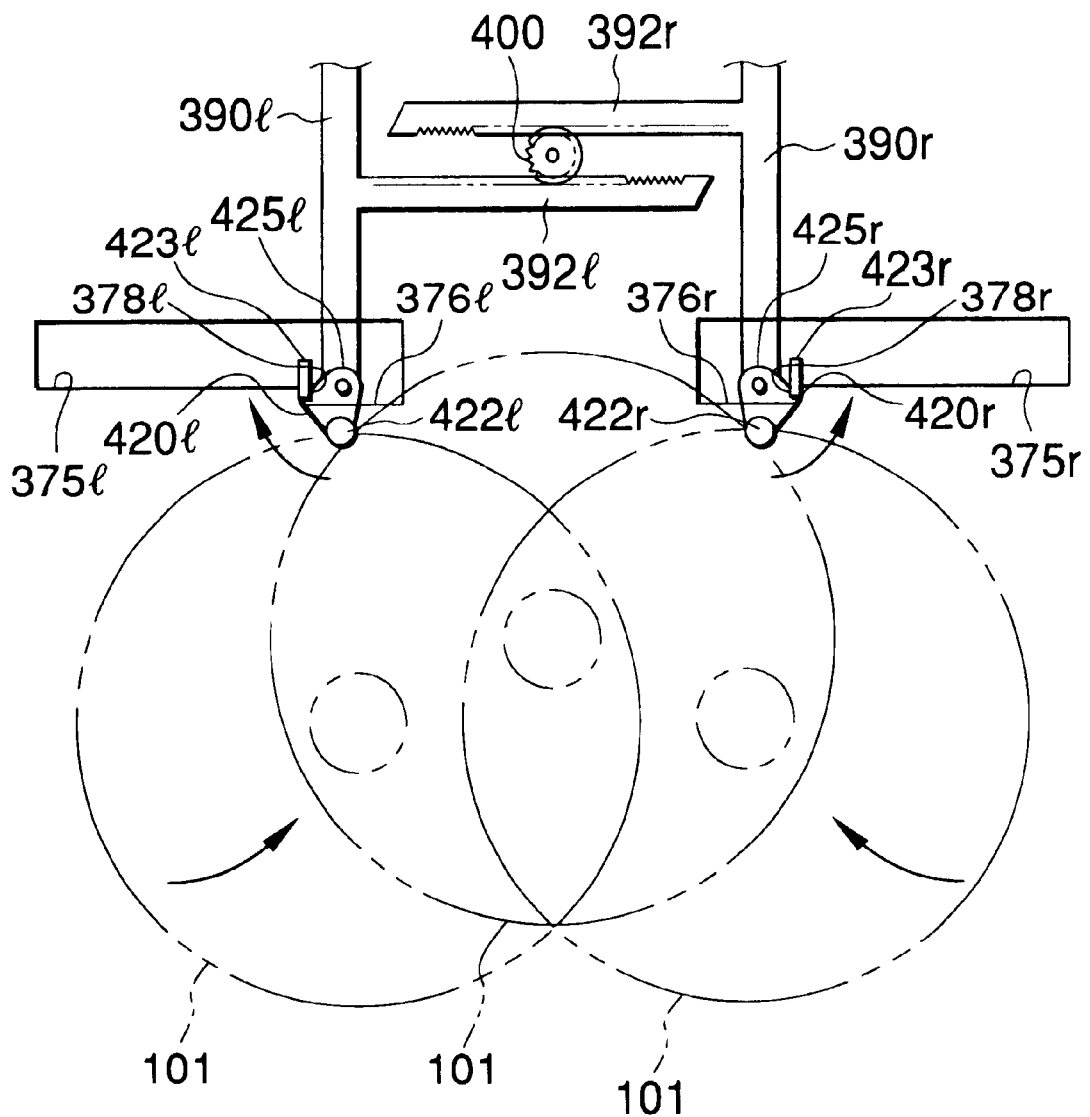
FIG. 19 is a schematic plan view showing centering members in a locked state.
Figure 20:
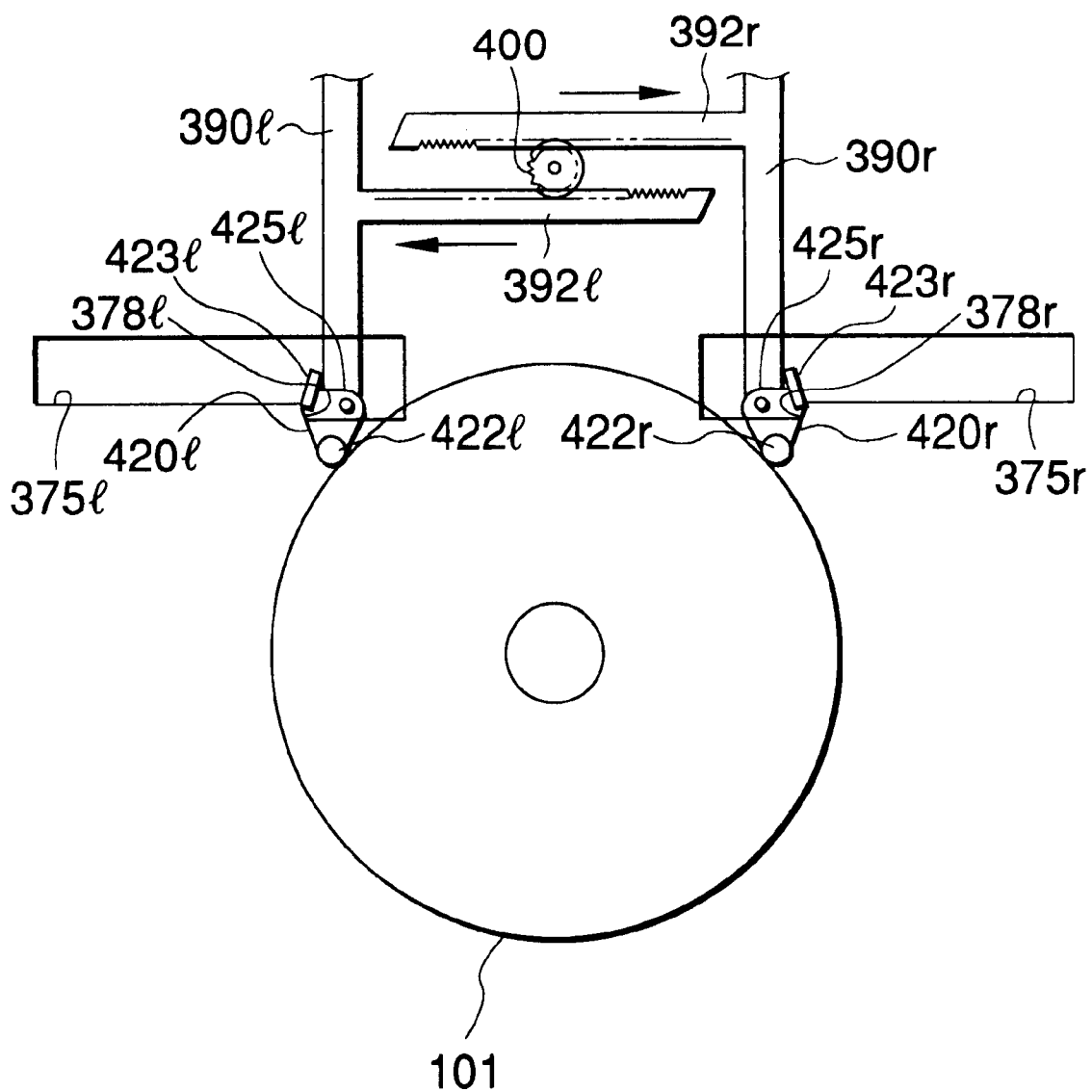
FIG. 20 is a schematic plan view showing the centering members in a state that they are unlocked.
Figure 21:
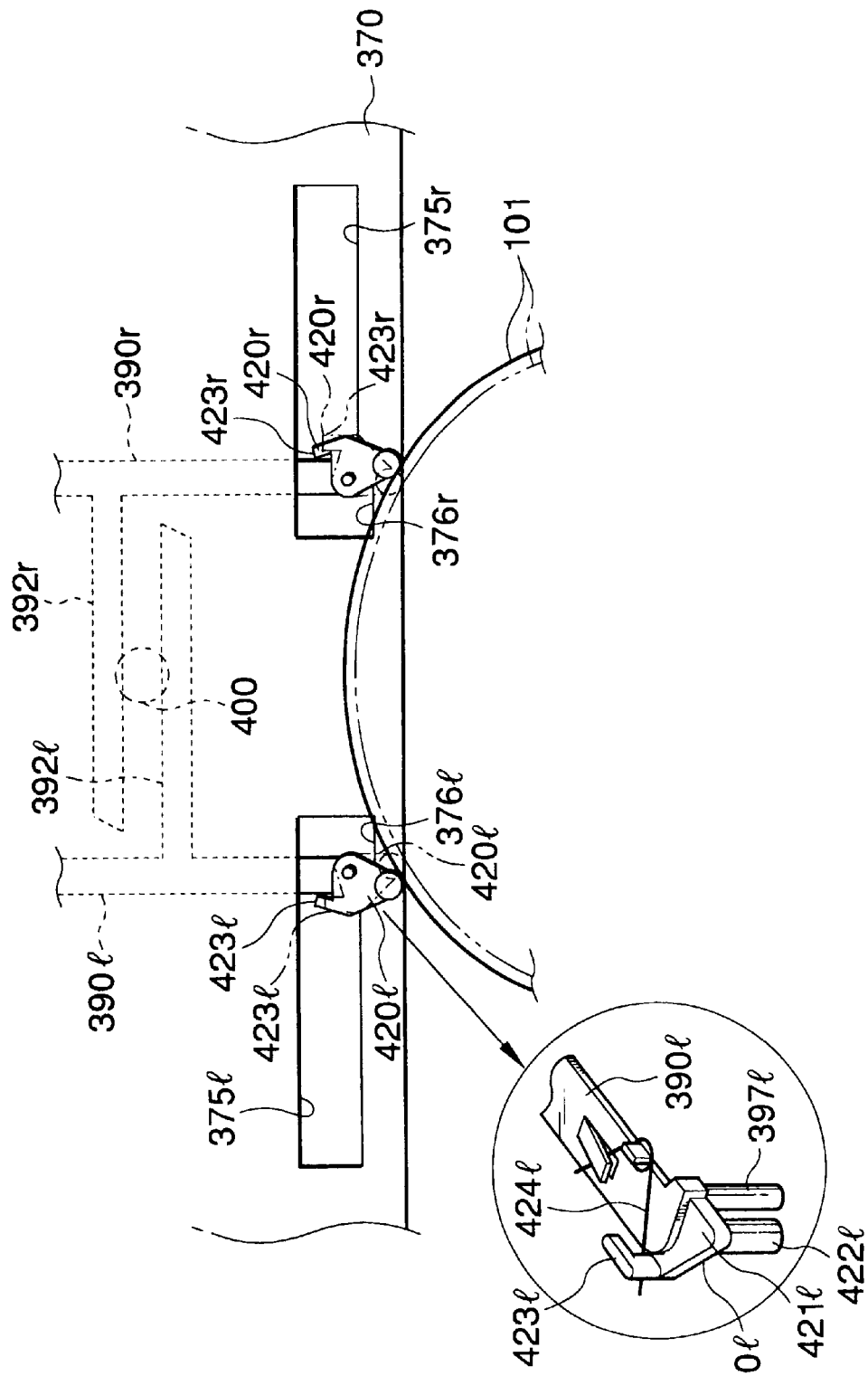
FIG. 21 is a schematic plan view showing a state that a 12-cm CD is inserted in the apparatus and the centering members are unlocked.
Figure 22:
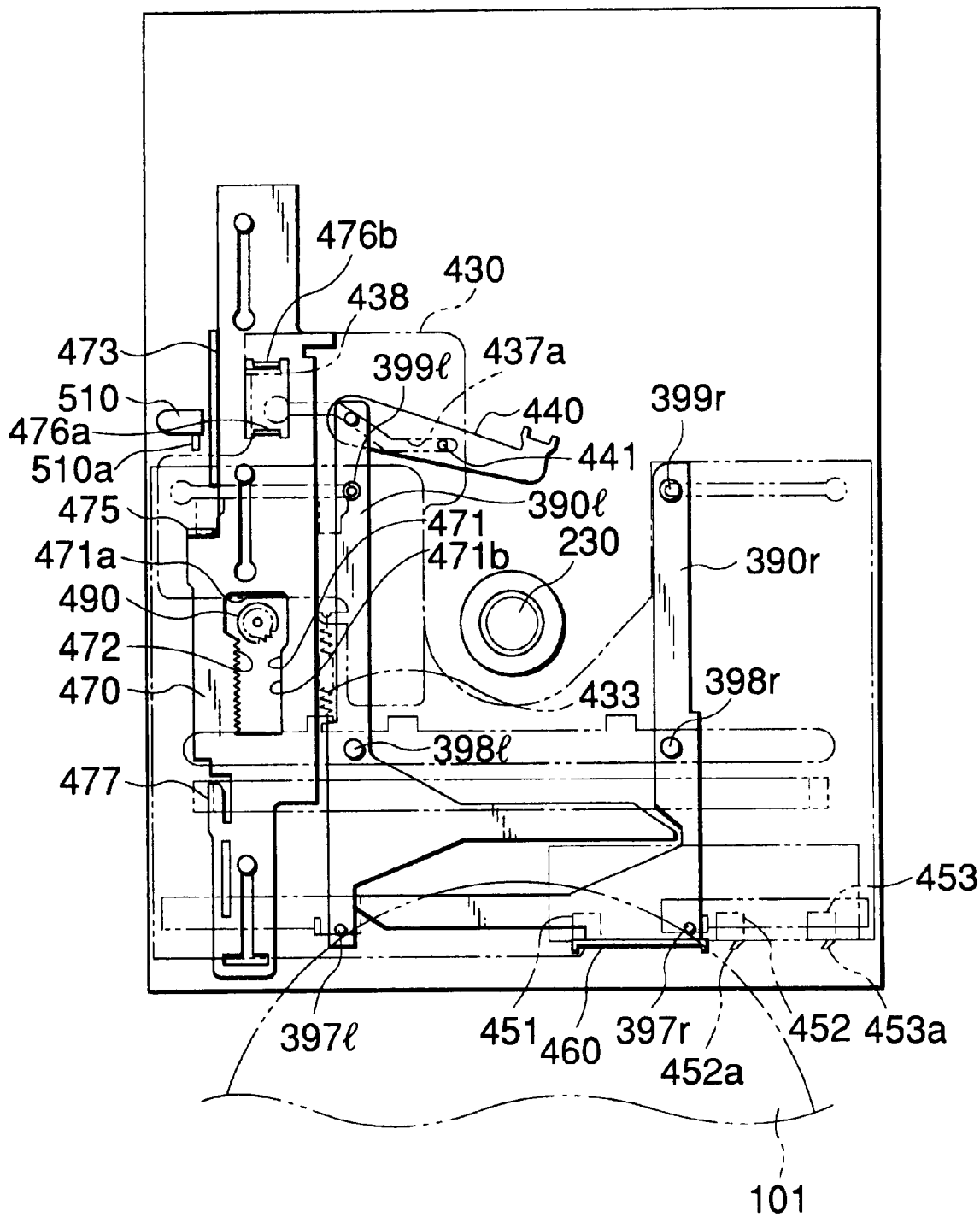
FIG. 22 is a schematic plan view showing a state that the outer periphery of the 12-cm CD butts insertion detecting pins.

As shown in FIGS. 19 and 20, the lock members 420l and 420r are rotatably supported by the front end portions of the centering members 390l and 390r, respectively. Rotational force is exerted on each of the lock members 420l and 420r by a spring member (not shown). More specifically, counterclockwise rotational force (as viewed from above) is exerted on the left-hand lock member 420l and clockwise rotational force (as viewed from above) is exerted on the right-hand lock member 420r.

In the lock members 420l and 420r, one corner portions of the main portions 425l and 425r that are planar and approximately triangular are rotatably supported by the centering members 390*l* and 390*r*, respectively. The pins 422*l* and 422*r* to be pressed, which serve as positioning members, project downward from the main portions 425*l* and 425*r* at another corner portions, respectively. Further, the engagement pieces 423*l* and 423*r* are provided on the main portions 421*l* and 421*r* at the remaining corner portions, respectively.

The main support substrate 370 is formed with the escape slits 375*l* and 375*r* that are long in the right-left direction. The engagement cuts 376*l* and 376*r* are formed at the front peripheries of the adjacent end portions of the escape slits 375*l* and 375*r*, respectively. The engagement pieces 423*l* and 423*r* of the lock members 420*l* and 420*r* are located within the escape slits 375*l* and 375*r*, respectively. In a state that the centering members 390*l* and 390*r* are closest to each other, the engagement pieces 423*l* and 423*r* are caused to engage the peripheries 378*l* and 378*r*, far from each other, of the engagement cuts 376*l* and 376*r* by the rotational force exerted on the lock members 420*l* and 420*r*, whereby the centering members 390*l* and 390*r* are rendered in a state that they cannot go away from each other any further, i.e., they are locked.

If in this state the disc 100 is inserted into the apparatus with a correct positional relationship that the center line of the disc 100 coincides with the center of the pull-in roller (not shown), the outer periphery of the disc 100 butt the two pins 422*l* and 422*r* to be pressed at the same time (see FIG. 19) and push the pins outward. As a result, the lock members 420*l* and 420*r* rotate against the rotational force exerted on themselves. More specifically, the left-hand lock member 420*l* rotates clockwise and the right-hand lock member 420*r* rotates counterclockwise. Their engagement pieces 423*l* and 423*r* move approximately rearward whereby the engagement with the engagement cuts 378*l* and 378*r* is canceled (see FIG. 20), that is, the locking of the centering members 390*l* and 390*r* is canceled.

When the pins 422*l* and 422*r* to be pressed are pushed by the outer periphery of the disc 100 and the centering members 390*l* and 390*r* are thereby moved in such directions as to go away from each other, the pull-in roller (not shown) is rotated to pull the disc 100 into the apparatus. During this course, the outer periphery of the disc 100 butts the two pins 422*l* and 422*r* to be pressed and hence the disc 100 is positioned correctly.

In contrast, if the disc 100 is inserted into the apparatus with an incorrect positional relationship (indicated by two-dot chain lines in FIG. 19), only one of the centering members 390*l* and 390*r* is released from the locking by the lock members 420*l* and 420*r* and hence the centering members 390*l* and 390*r* cannot move in such directions as to go away from each other. Thus, the disc 100 can be prevented from being inserted into the apparatus.

Next, loading of the discs 101 and 102 will be described with reference to FIGS. 21–41.

First, loading of the 12-cm CD 101 will be described. It is noted that the push switches 451–453 and 510 are so configured as to output high-level signals when the respective parts 451*a*–453*a* and 510*a* to be pressed are pushed, and output low-level signals when they are not pushed.

As the 12-cm CD 101 is inserted into the apparatus through the insertion mouth (not shown), first the pins 422*l* and 422*r* to be pressed of the lock members 420*l* and 420*r* are pushed outward by the outer periphery of the 12-cm CD 101 (indicated by a two-dot chain line in FIG. 21), whereby the lock members 420*l* and 420*r* are rotated clockwise and counterclockwise, respectively. As a result, the engagement pieces 423*l* and 423*r* are disengaged rearward from the outer peripheries of the cuts 376*l* and 376*r*, respectively (indicated by a solid line in FIG. 21), and the centering members 390*l* and 390*r* are unlocked.

Then, the outer periphery of the 12-cm CD 101 pushes the insertion detecting pins 397*l* and 397*r* (see FIG. 22), whereby the centering members 390*l* and 390*r* move in synchronism with each other in such direction as to go away from each other.

Figure 23:
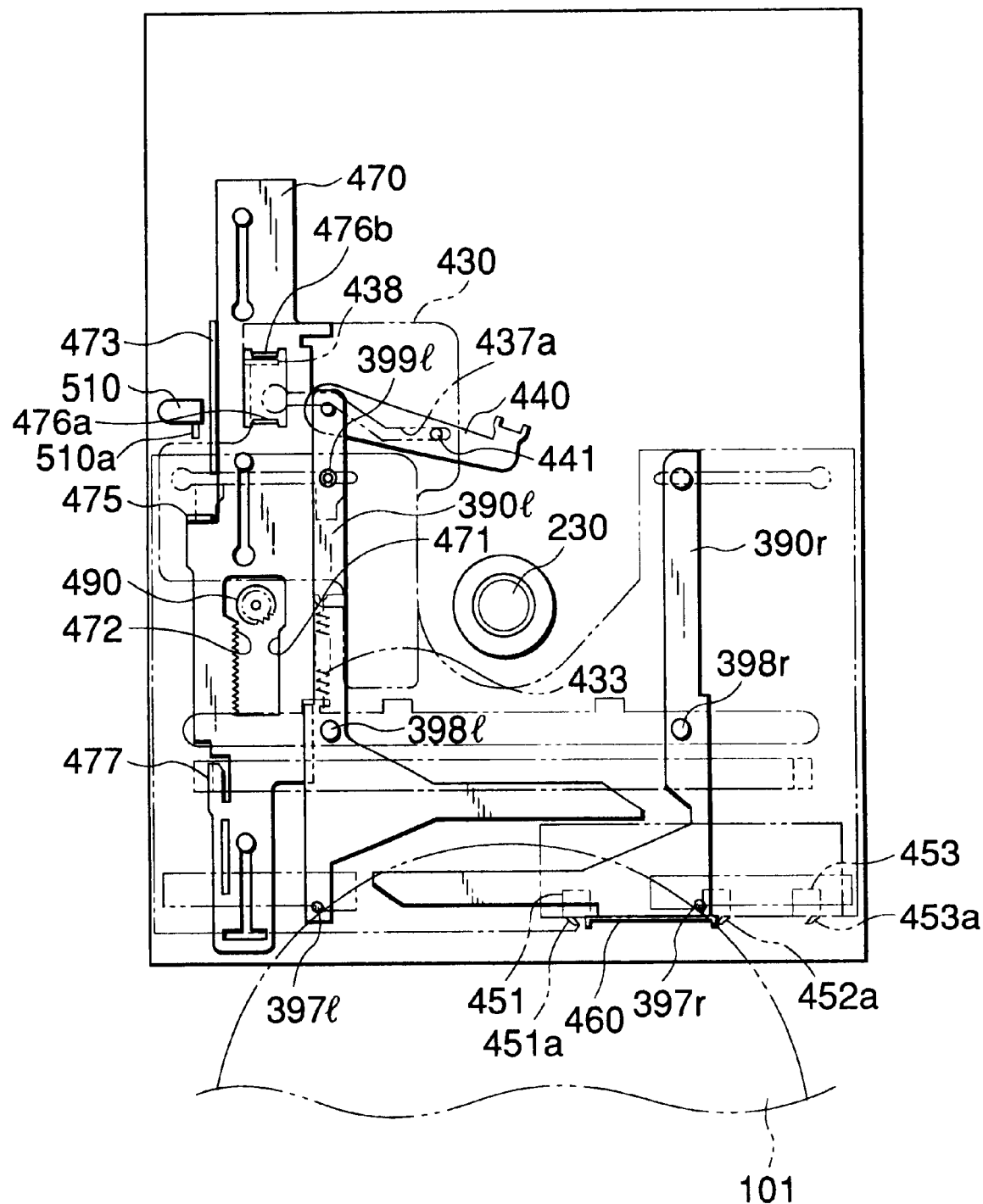
FIG. 23 is a schematic plan view showing a state that the 12-cm CD is further inserted and a switch pressing piece is separated from a left-hand push switch.
Figure 24:
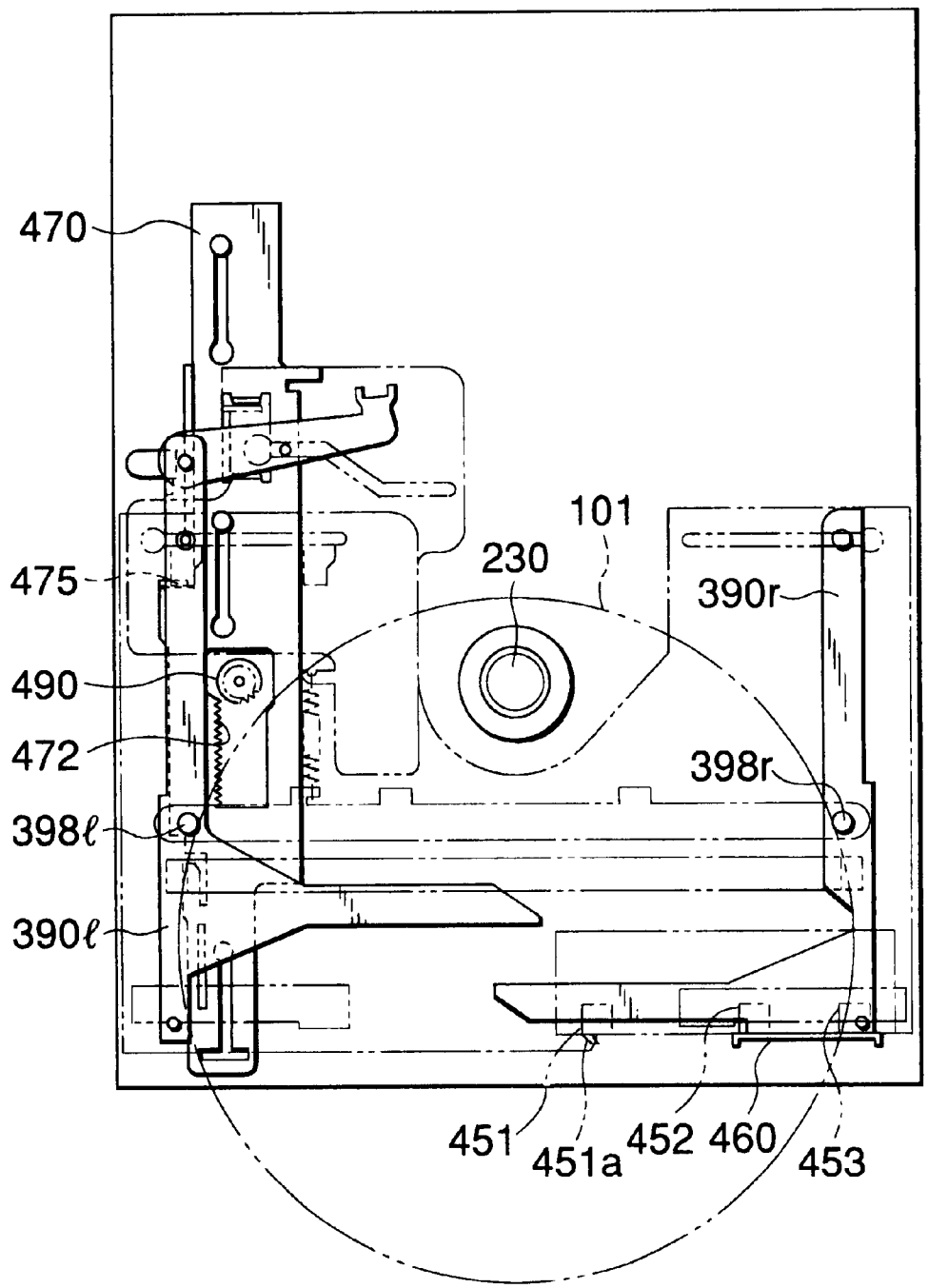
FIG. 24 is a schematic plan view showing a state that the 12-cm CD is further inserted and its outer periphery butts front centering shafts.

As the centering members 390*l* and 390*r* move in the above manner, the switch pressing piece 460 moves rightward, whereby its left end portion separates from the part 451*a* to be pressed of the left-hand push switch 451 (see FIG. 23). The output of the push switch 451 thus turns to the low level.

When the output of the push switch 451 turns to the low level, the loading motor 340 starts to rotate in the loading direction (see FIG. 38), whereby the pull-in roller 310 is rotated clockwise when viewed from the right side and the pinion gear 490 is rotated clockwise when viewed from above. At this time, since part of the 12-cm CD 101 is interposed and held between the pull-in roller 310 and the bottom surface of the auxiliary support substrate 380 (see FIG. 29), the 12-cm CD 101 is pulled inward by the rotation of the pull-in roller 310.

As the 12-cm CD 101 is pulled inward, the centering members 390*l* and 390*r* are increasingly separated from each other and first the part 452*a* to be pressed of the push switch 452 is pushed by the switch pressing piece 460. After a while the part 453*a* to be pressed of the push switch 453 is pushed by the switch pressing piece 460 (see FIG. 24).

A controller (not shown; a microcomputer, for instance) detects that the outputs of the push switches 452 and 453 have turned to the low level, to thereby detect the loading of the 12-cm CD 101. Based on this detection, a disc ejection amount at the time of unloading (described later), i.e., stop timing of rotation of the loading motor 340 in the unloading direction and other things are controlled.

Figure 25:
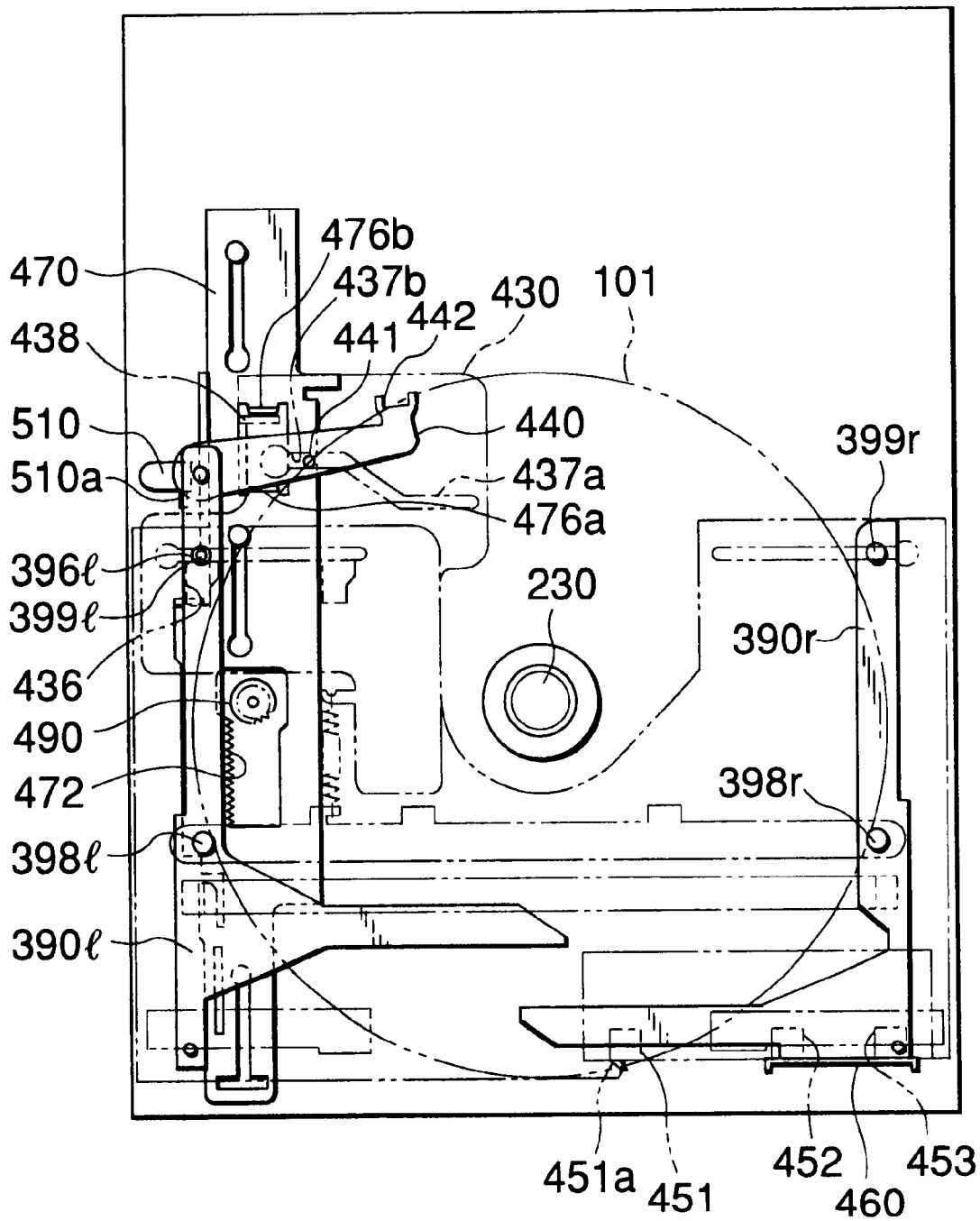
FIG. 25 is a schematic plan view showing a state that the 12-cm CD is further inserted, i.e., a state immediately before it is centered by four centering shafts.

When the 12-cm CD 101 is further pulled in to such an extent that its outer periphery comes to a position immediately before a position where the outer periphery contacts the rear centering shafts 399*l* and 399*r*, the outer periphery butts the piece 442 to be pressed of the judgment lever 440 (see FIG. 25). At this time, the leftward movement of the left-hand centering member 390*l* has caused its pin 396*l* to be guided to be located at a position corresponding to the left-hand escape cut 436 of the mode slider 430 (see FIG. 26). Further, the judgment lever 440 is moved leftward together with the centering member 390*l*, whereby its pin 441 to be controlled comes to such a position as to engage the left-hand portion 437*b* of the control slit 437 of the mode slider 430 (see FIG. 26).

When the 12-cm CD 101 is slightly pulled inward from the above state, its outer periphery comes to also contact the rear centering shafts 399*l* and 399*r*, whereby the outer periphery is rendered in contact with the four centering shafts 398*l*, 398*r*, 399*l*, and 399*r* (see FIG. 26) and is centered thereby. A state is thus established in which the center of the 12-cm CD 101 is opposed to the center of the turn table 230 from above. Since during this course the outer periphery of the 12-cm CD 101 pushes rearward the part 442 to be pressed of the judgment lever 440, the judgment lever 440 is slightly rotated counterclockwise when viewed from above. And since the pin 441 to be controlled of the judgment lever 440 pushes rearward the rear periphery of the left-hand portion 437*b* of the control slit 437 of the mode slider 430, the mode slider is slightly moved rearward. The pin 396*l* to be guided of the left-hand centering member 390*l* goes into the left-hand escape cut 436 of the mode slider 430, to allow rearward movement of the mode slider 430. (When the pin 396*l* to be guided is located at a position other than the position corresponding to the escape cut 435 or 436, the pin 396*l* butts the front periphery of the slit 437 of the mode slider 430, to prevent its rearward movement.)

Figure 26:
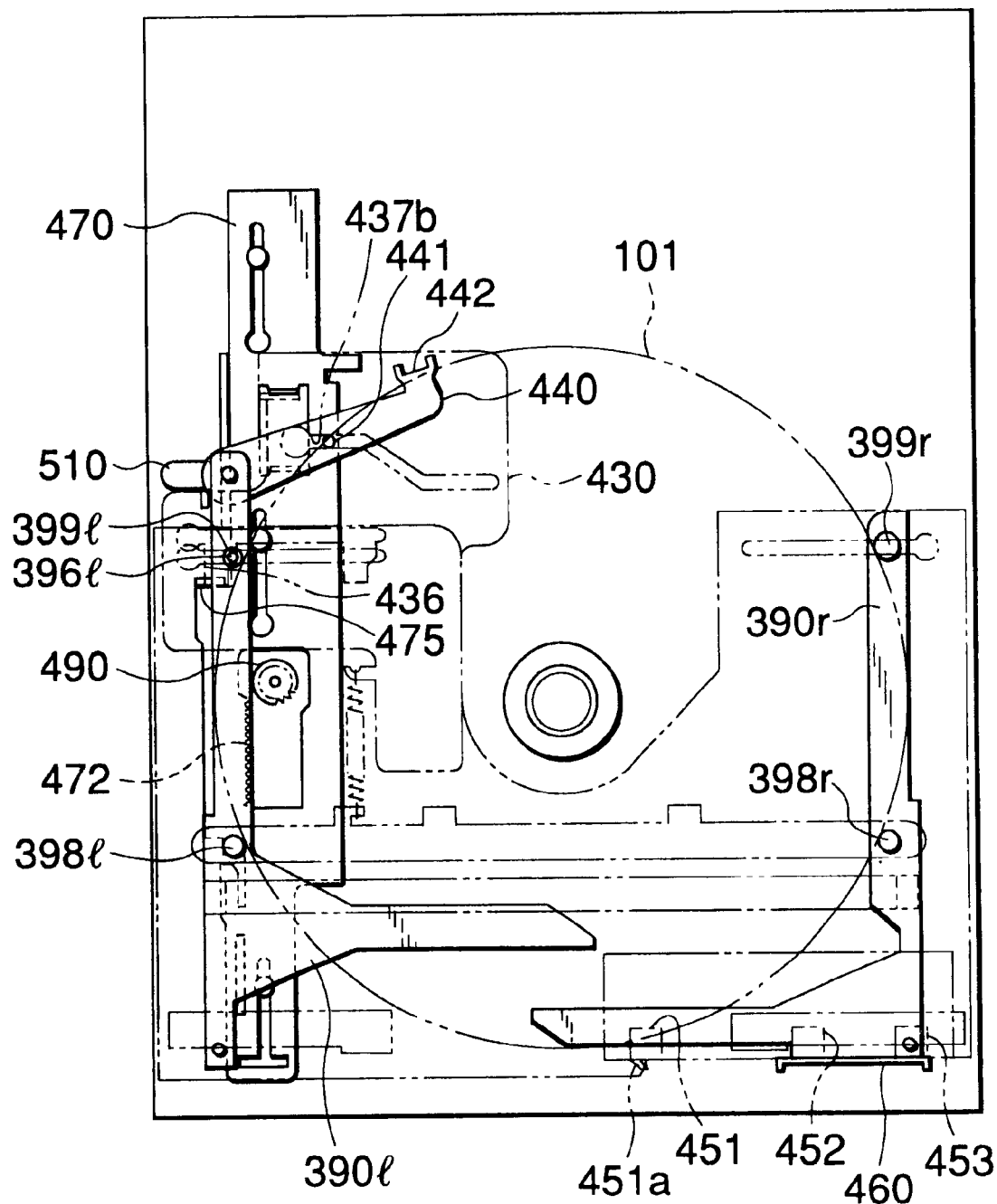
FIG. 26 is a schematic plan view showing a state that the 12-cm CD is further inserted and the four centering shafts butt its outer periphery and center it.
Figure 27:
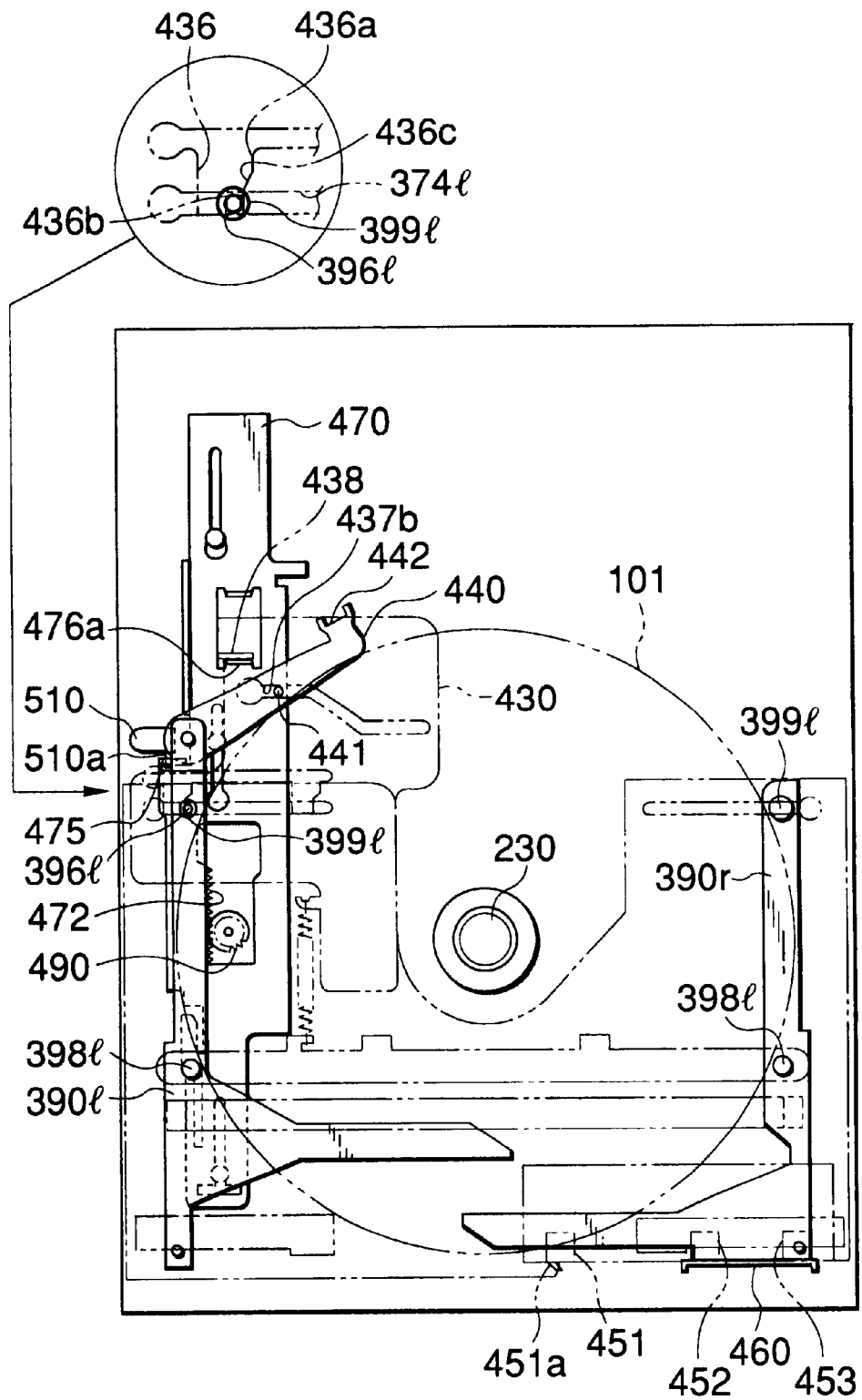
FIG. 27 is a schematic plan view showing a state that the 12-cm CD is chucked and the four centering shafts are separated from its outer periphery.

As the mode slider 430 slightly moves rearward, its projection 438 pushes rearward the rear projection 476*b* of the control slider 470, whereby the control slider 470 is slightly moved rearward and in turn the rack teeth 472 come to mesh with the pinion gear 490 (see FIG. 26). The control slider 470 is thereby moved rearward.

As the control slider 470 moves rearward, the pin 287 controlled of the swing base 280 of the chucking mechanism 270 moves relatively toward the front side along the slant portion 474*a* of the cam slit 474 of the cam piece 473 that is moving rearward, whereby the swing base 280 is rotated so that its front end portion is moved downward and the chuck plate 290 that is supported there is also moved downward. A state is thereby established in which the press plate 291 and the turn table 230 hold a central portion of the 12-cm CD 101 from above and below (see FIG. 30).

In a short time, the front projection 476*a* of the control slider 470 slightly pushes rearward the projection 438 of the mode slider 430 (see FIG. 27), whereby the mode slider 430 is slightly mode rearward. Since the pin 396*l* to be guided of the left-hand centering member 390*l* that abutted the rear portion 436*a* of the right-hand periphery of the escape cut 436 is pushed leftward first by the slant portion 436*c* and then by the front portion 436*b*, the two centering members 390*l* and 390*r* are moved so as to slightly go away from each other. The four centering shafts 398*l*, 398*r*, 399*l*, and 399*r* are thereby slightly separated from the outer periphery of the 12-cm CD 101 (see FIG. 27) so as not to obstruct its rotation. At the same time, the front periphery of the left-hand portion 437*b* of the control slit 437 of the mode slider 430 pushes rearward the pin 441 to be controlled, whereby the judgment lever 440 is slightly rotated counterclockwise and its piece 442 to be pressed is separated from the outer periphery of the 12-cm CD 101 (see FIG. 27). At the same time as the centering shafts 398*l*, 398*r*, 399*l*, and 399*r* and the piece 442 to be pressed are separated from the outer periphery of the 12-cm CD 101, the switch pressing piece 475 of the control slider 470 pushes the part 510*a* to be pressed of the push switch 510 (see FIG. 27). The output signal of the push switch 510 thereby turns to the high level (see FIG. 38), whereupon the rotation of the loading motor 340 is stopped. The loading of the 12-cm CD 101 is thus completed.

Figure 30:
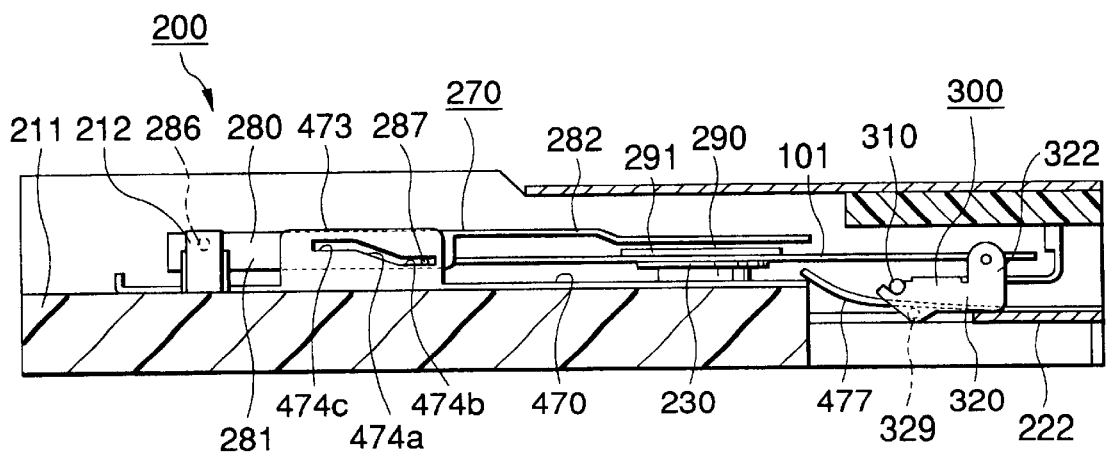
FIG. 30 is a side view of the main part showing a state that the 12-cm CD is chucked.
Figure 31:
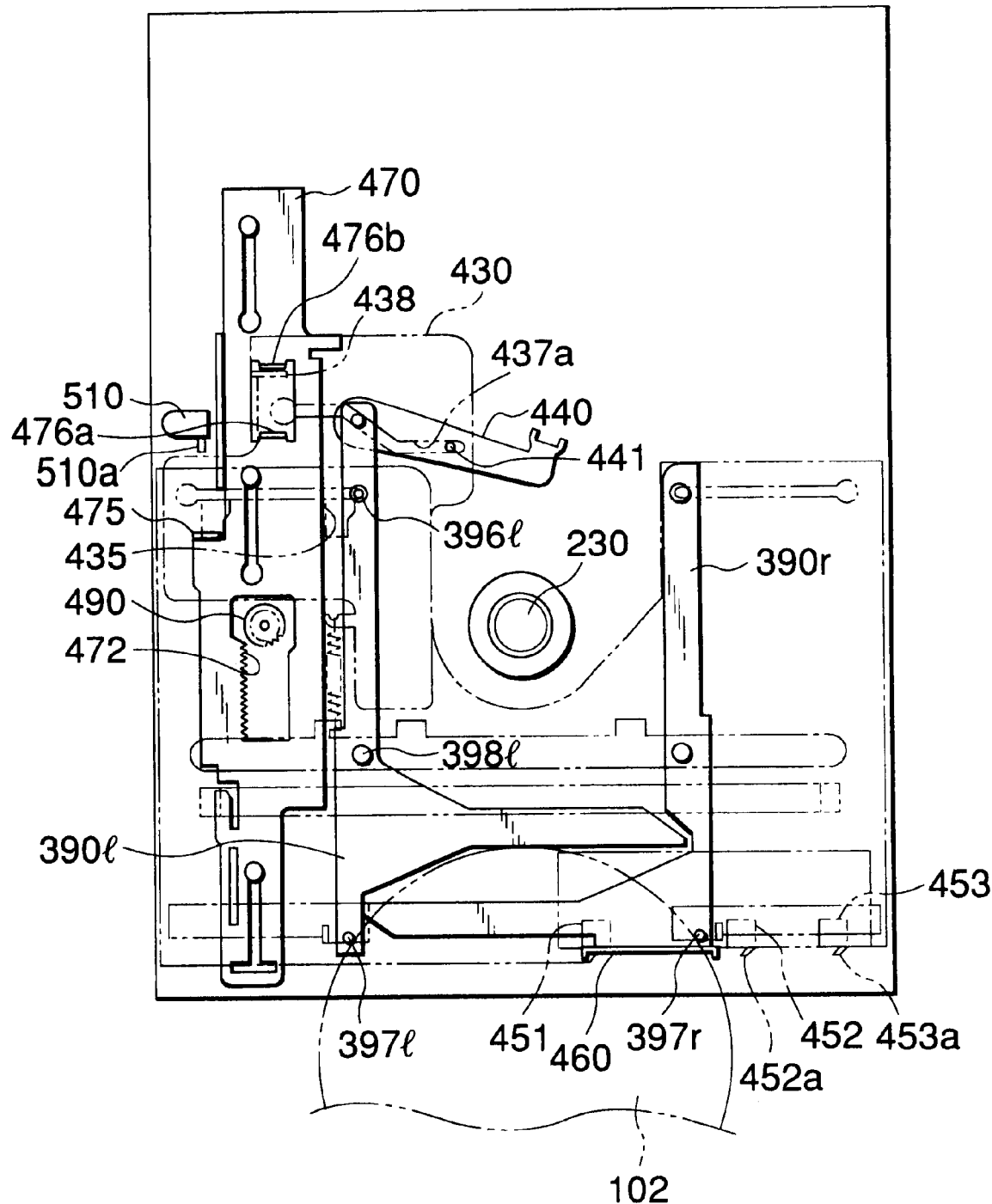
FIG. 31 is a schematic plan view showing a state that a 8-cm CD is inserted in the apparatus and the centering members are unlocked as well as the outer periphery of the 8-cm CD butts the insertion detecting pins.

During the above course, the pin 329 to be controlled of the swing support plate 320 of the pull-in roller block 300 slides relatively toward the front side on the bottom surface of the roller control piece 477 of the control slider 470, whereby the swing support plate 320 is rotated counterclockwise when viewed from the left side and the rubber roller 314 of the pull-in roller 310 that is supported there is separated from the 12-cm CD 101 (see FIG. 30).

Next, loading of the 8-cm CD 102 will be described.

As the 8-cm CD 102 is inserted into the apparatus through the insertion mouth (not shown), first the pins 422*l* and 422*r* to be pressed of the lock members 420*l* and 420*r* are pushed outward by the outer periphery of the 8-cm CD 102, whereby the lock members 420*l* and 420*r* are rotated clockwise and counterclockwise, respectively. As a result, the engagement pieces 423*l* and 423*r* are disengaged rearward from the outer peripheries of the cuts 376*l* and 376*r*, respectively, and the centering members 390C and 390*r* are unlocked. The above operation is the same as in the case of the 12-cm CD 101.

Then, the outer periphery of the 8-cm CD 102 pushes the front insertion detecting pins 397*l* and 397*r* (see FIG. 31), whereby the centering members 390*l* and 390*r* move in synchronism with each other in such direction as to go away from each other.

As the centering members 390*l* and 390*r* move in the above manner, the switch pressing piece 460 moves rightward, whereby its left end portion separates from the part 451*a* to be pressed of the left-hand push switch 451. The output of the push switch 451 thus turns to the low level (see FIG. 39).

When the output of the push switch 451 turns to the low level, the loading motor 340 starts to rotate in the loading direction (see FIG. 39), whereby the pull-in roller 310 is rotated clockwise when viewed from the right side and the pinion gear 490 is rotated clockwise when viewed from above. At this time, since part of the 8-cm CD 102 is interposed and held between the pull-in roller 310 and the bottom surface of the auxiliary support substrate 380, the 8-cm CD 102 is pulled inward by the rotation of the pull-in roller 310.

Figure 32:
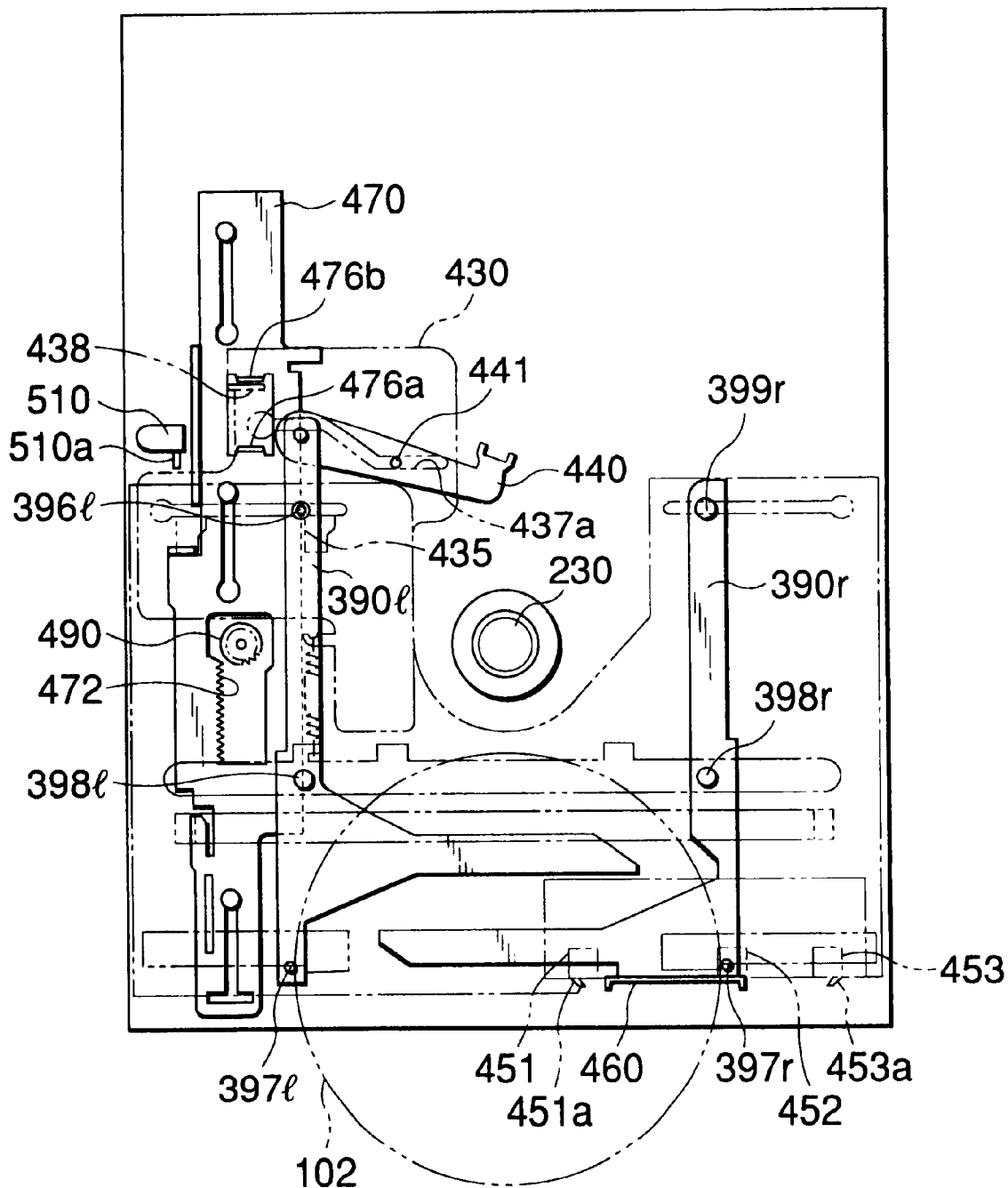
FIG. 32 is a schematic plan view showing a state that the 8-cm CD is further inserted and the switch pressing piece pushes a central push switch.
Figure 33:
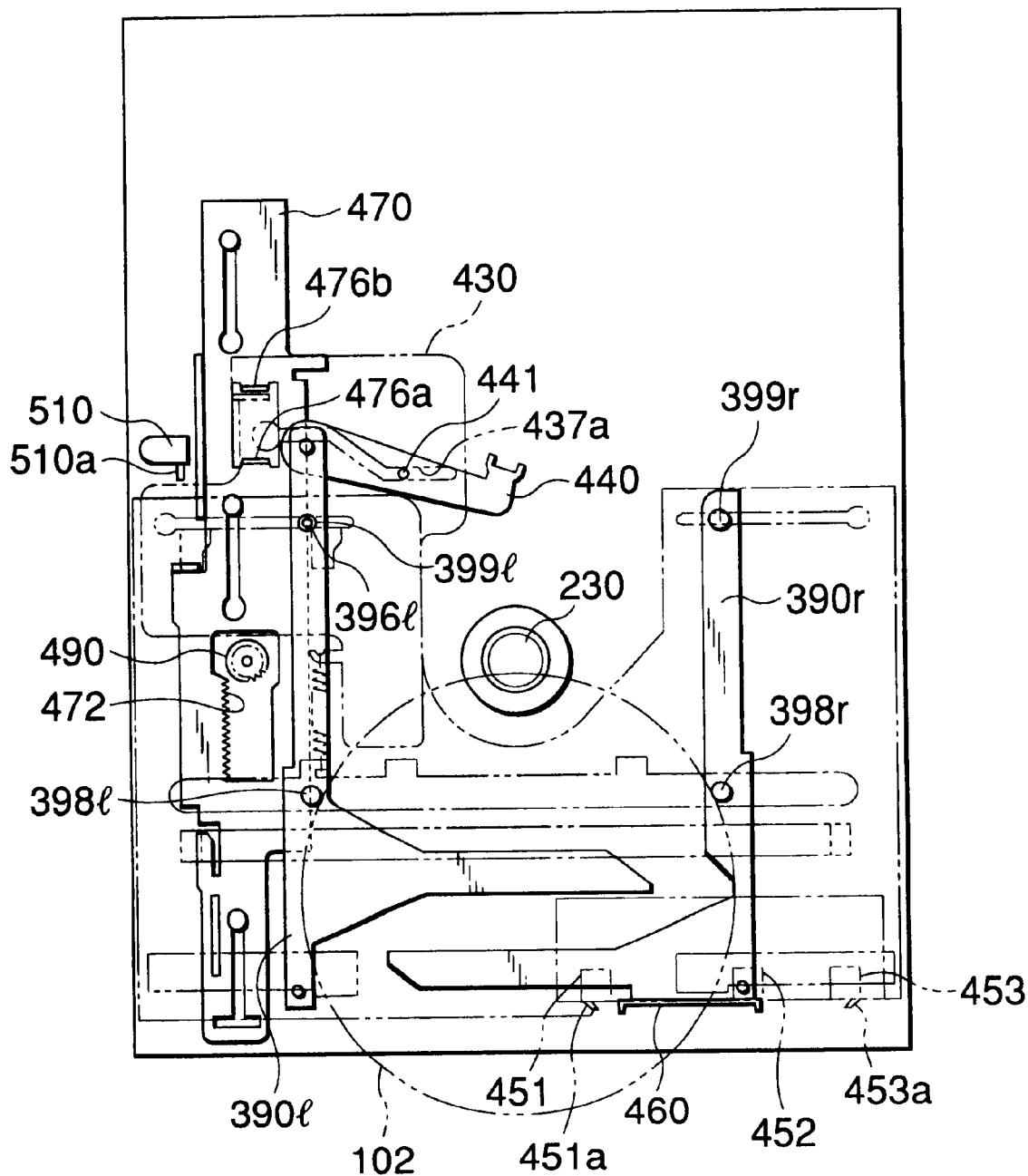
FIG. 33 is a schematic plan view showing a state that the 8-cm CD is further inserted and its outer periphery butts the front centering shafts.

As the 8-cm CD 102 is pulled inward, the centering members 390*l* and 390*r* are increasingly separated from each other and first the part 452*a* to be pressed of the push switch 452 is pushed by the switch pressing piece 460 (see FIG. 32). The above operations are still the same as in the case of the 12-cm CD 101.

In the case of the 8-cm CD 102, its maximum-diameter portion passes rearward the line connecting the insertion detecting pins 397*l* and 397*r* immediately after the part 452*a* to be pressed of the push switch 452. Therefore, the centering members 390*l* and 390*r* are moved so as to come closer to each other until the insertion detecting pins 397*l* and 397*r* and the front centering shafts 398*l* and 398*r* butt the outer periphery of the 8-cm CD 102. Therefore, the right end portion of the switch pressing piece 460 escapes leftward from the part 452*a* of the central push switch 452, and hence the output level of the push switch 452 turns to the low level (see FIG. 39).

When the 8-cm CD 102 is further pulled inward, its outer periphery pushes the front centering shafts 398*l* and 398*r* so as to make them go away from each other, whereby the centering members 390*l* and 390*r* are moved so as to go away from each other. The switch pressing piece 460 is thereby moved rightward to again pushes the part 452*a* to be pressed of the push switch 452 (see FIG. 33), and hence the output level of the push switch 452 again turns to the high level (FIG. 39).

Figure 39:
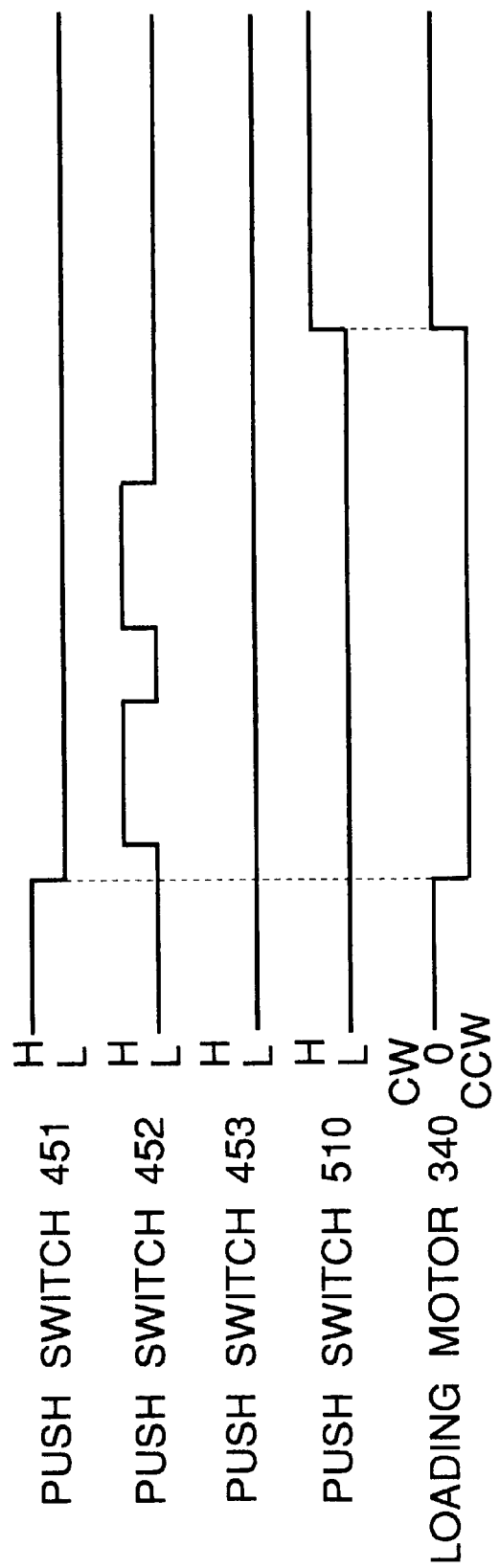
FIG. 39 is a time chart showing output levels of the respective push switches and states of the loading motor during loading of the 8-cm CD.

After the maximum-diameter portion of the 8-cm CD 102 passes the line connecting the front centering shafts 398*l* and 398*r*, the right end portion of the switch pressing piece 460 again escapes leftward from the part 452*a* to be pressed of the push switch 452, whereby the output of the push switch 452 turns to the low level (see FIG. 39).

As described above, the output of the push switch 452 once turns to the high level, returns to the low level immediately thereafter, again turns to the high level, and again returns to the low level. Based on such an output waveform, the controller (not shown) detects the loading of the 8-cm CD 102 and employs it as information for the subsequent control.

Figure 34:
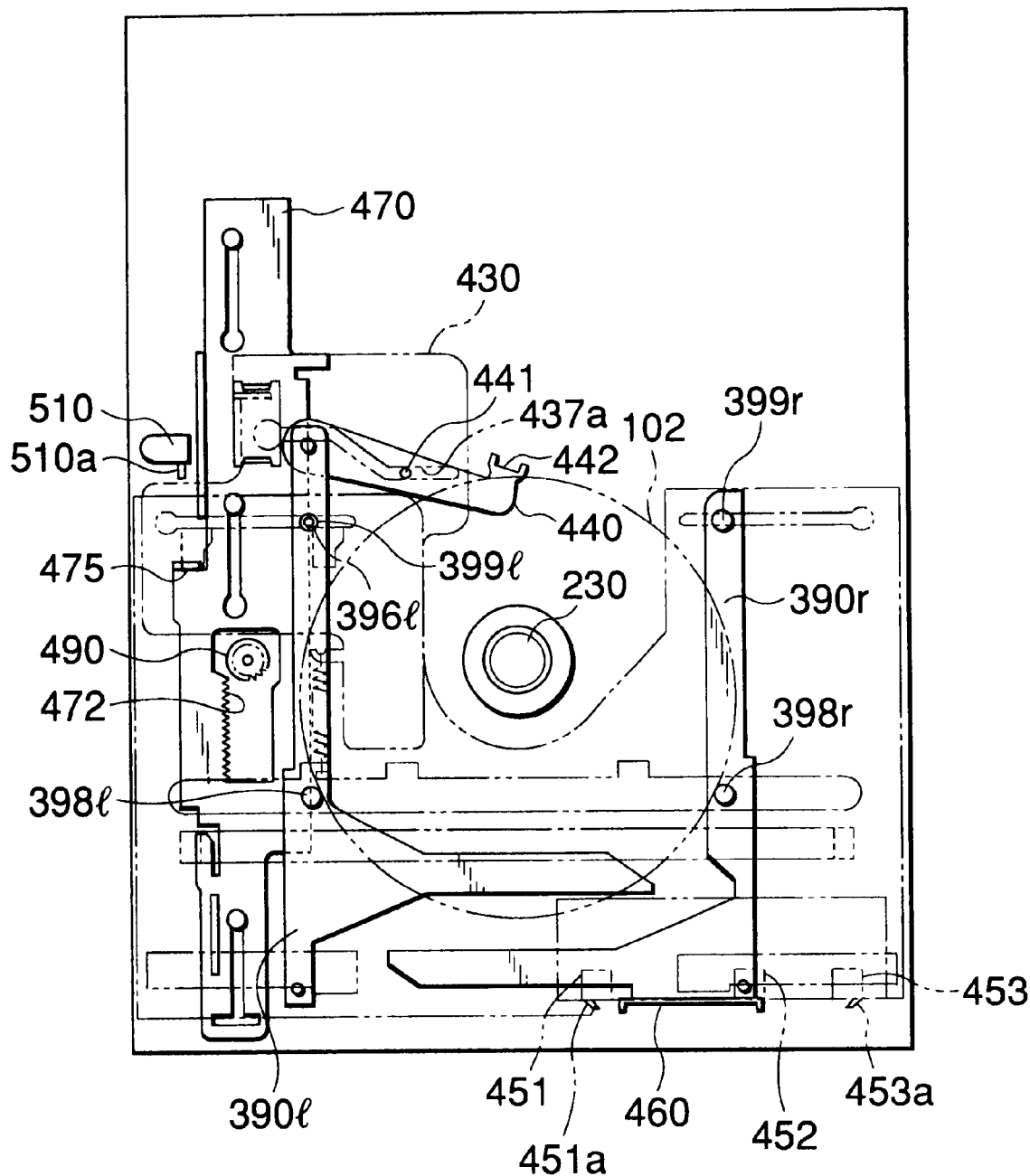
FIG. 34 is a schematic plan view showing a state that the 8-cm CD is further inserted, i.e., a state immediately before it is centered.
Figure 35:
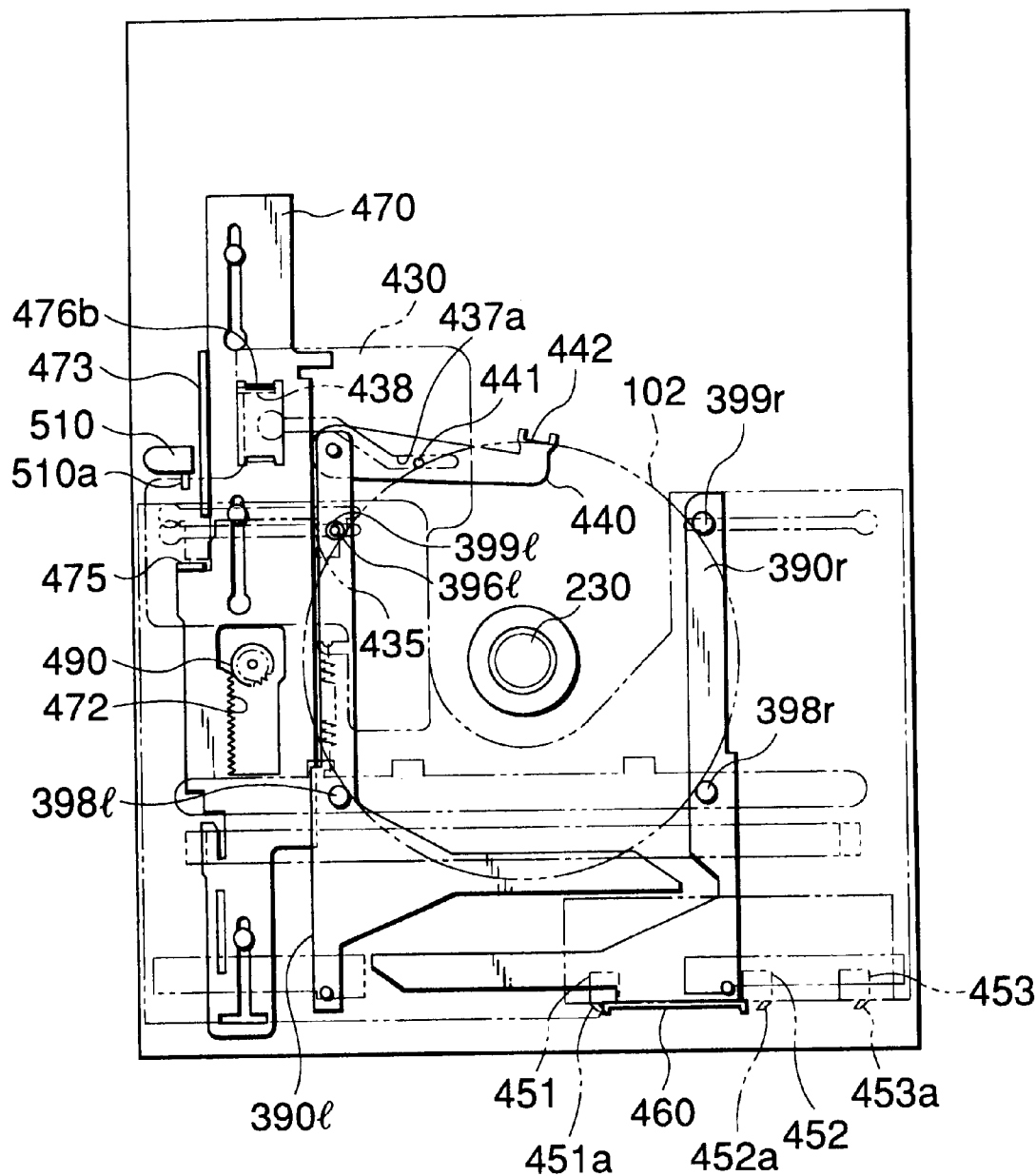
FIG. 35 is a schematic plan view showing a state that the 8-cm CD is further inserted and the four centering shafts butt its outer periphery and center it.
Figure 36:
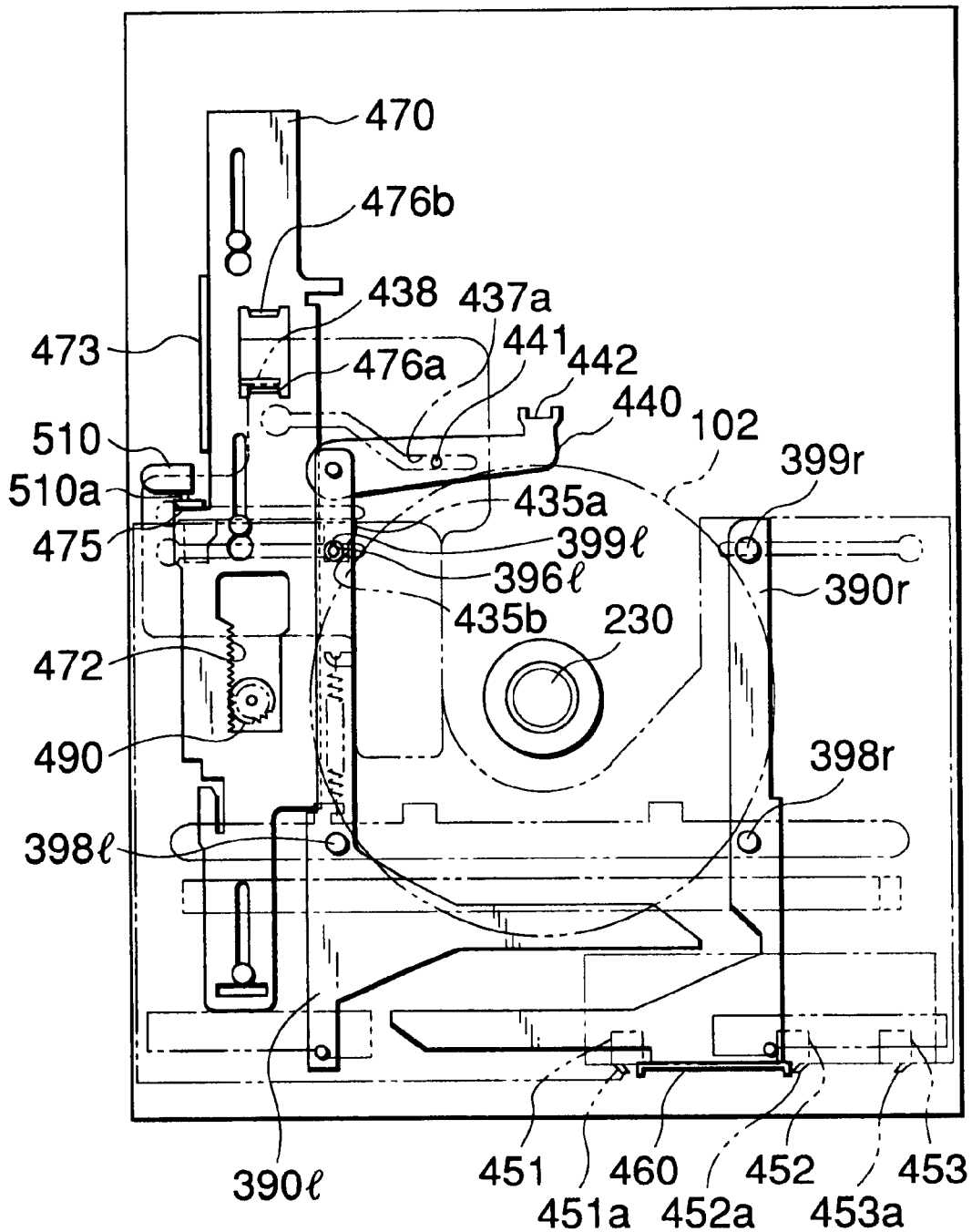
FIG. 36 is a schematic plan view showing a state that the 8-cm CD is chucked and the four centering shafts are separated from its outer periphery.

When the 8-cm CD 102 is further pulled in to such an extent that its outer periphery comes to a position immediately before a position where the outer periphery contacts the rear centering shafts 399*l* and 399*r*, the outer periphery butts the piece 442 to be pressed of the judgment lever 440 (see FIG. 34). At this time, the leftward movement of the left-hand centering member 390*l* has caused its pin 396*l* to be guided to be located at a position corresponding to the right-hand escape cut 435 of the mode slider 430. Further, the pin 441 to be controlled of the judgment lever 440 comes to such a position as to engage the left-hand portion 437*b* of the control slit 437 of the mode slider 430.

When the 8-cm CD 102 is slightly pulled inward from the above state, its outer periphery comes to also contact the rear centering shafts 399*l* and 399*r* (see FIG. 35), whereby the outer periphery is rendered in contact with the four centering shafts 398*l*, 398*r*, 399*l*, and 399*r* and is centered thereby. A state is thus established in which the center of the 12-cm CD 101 is opposed to the center of the turn table 230 from above. Since during this course the outer periphery of the 12-cm CD 101 pushes rearward the part 442 to be pressed of the judgment lever 440, the judgment lever 440 is slightly rotated counterclockwise when viewed from above. And since the pin 441 to be controlled of the judgment lever 440 pushes rearward the rear periphery of the right-hand portion 437*a* of the control slit 437 of the mode slider 430, the mode slider is slightly moved rearward. The pin 396*l* to be guided of the left-hand centering member 390*l* goes into the left-hand escape cut 436 (the rear end portion 435*a* of the right-hand periphery) of the mode slider 430, to allow rearward movement of the mode slider 430.

As the mode slider 430 slightly moves rearward, its projection 438 pushes rearward the rear projection 476*b* of the control slider 470 (see FIG. 35), whereby the control slider 470 is slightly moved rearward and in turn the rack teeth 472 come to mesh with the rotating pinion gear 490. The control slider 470 is thereby moved rearward.

As the control slider 470 moves rearward, the pin 287 controlled of the swing base 280 of the chucking mechanism 270 moves relatively toward the front side along the slant portion 474*a* of the cam slit 474 of the cam piece 473 that is moving rearward, whereby the swing base 280 is rotated so that its front end portion is moved downward and the chuck plate 290 that is supported there is also moved downward. A state is thereby established in which the press plate 291 and the turn table 230 hold a central portion of the 8-cm CD 102 from above and below.

In a short time, the front projection 476*a* of the control slider 470 slightly pushes rearward the projection 438 of the mode slider 430, whereby the mode slider 430 is slightly mode rearward. Since the pin 396*l* to be guided of the left-hand centering member 390*l* that abutted the rear portion 435*a* of the right-hand periphery of the escape cut 435 is pushed leftward first by the slant portion 436*c* and then by the front portion 435*b*, the two centering members 390*l* and 390*r* are moved so as to slightly go away from each other. The four centering shafts 398*l*, 398*r*, 399*l*, and 399*r* are thereby slightly separated from the outer periphery of the 8-cm CD 102 so as not to obstruct its rotation. At the same time, the front periphery of the right-hand portion 437*a* of the control slit 437 of the mode slider 430 pushes rearward the pin 441 to be controlled, whereby the judgment lever 440 is slightly rotated counterclockwise and its piece 442 to be pressed is separated from the outer periphery of the 8-cm CD 102 (see FIG. 36). At the same time as the centering shafts 398*l*, 398*r*, 399*l*, and 399*r* and the piece 442 to be pressed are separated from the outer periphery of the 8-cm CD 102, the switch pressing piece 475 of the control slider 470 pushes the part 510*a* to be pressed of the push switch 510.

The output signal of the push switch 510 thereby turns to the high level, whereupon the rotation of the loading motor 340 is stopped (see FIG. 39). The loading of the 8-cm CD 102 is thus completed.

During the above course, the pin 329 to be controlled of the swing support plate 320 of the pull-in roller block 300 slides relatively toward the front side on the bottom surface of the roller control piece 477 of the control slider 470, whereby the swing support plate 320 is rotated counterclockwise when viewed from the left side and the rubber roller 314 of the pull-in roller 310 that is supported there is separated from the 8-cm CD 102.

Next, unloading of the discs 101 and 102, i.e., their ejection outside the apparatus, will be described.

First, unloading of the 12-cm CD 101 will be described.

If an unloading instruction is made in a state that the 12-cm CD 101 is loaded, for example, if an ejection button provided on a chassis front surface (not shown) is depressed, the loading motor 340 is rotated in the unloading direction (see FIG. 40) and both of the pull-in roller 310 and the pinion gear 490 are thereby rotated in the unloading direction. That is, the pull-in roller 310 is rotated clockwise when viewed from the left side and the pinion gear 490 is rotated counterclockwise when viewed from above.

When the pinion gear 490 rotates in the unloading direction, the control slider 470 whose rack teeth 472 mesh with it is fed forward. As a result, first the front projection 476*a* of the control slider 470 goes away from the projection 438 of the mode slider 430, and hence the tensile force of the tension coiled spring 433 causes the mode slider 430 to move forward until the piece 442 to be pressed of the judgment lever 440 butts the outer periphery of the 12-cm CD 101. In association with this operation, the centering members 390*l* and 390*r* are slightly moved in such directions as to come closer to each other, whereby the four centering shafts 398*l*, 398*r*, 399*l*, and 399*r* butt the outer periphery of the 12-cm CD 101. During this course, the switch pressing piece 475 of the control slider 470 is separated forward from the part 510*a* to be pressed of the push switch 510, whereby the output level of the push switch 510 turns to the low level (see FIG. 40). Since the pull-in roller 310 is separated under the 12-cm CD 101, its rotation does not influence the 12-cm CD 101.

As the control slider 470 further moves forward, the pin 329 to be controlled of the swing support plate 320 of the pull-in roller block 300 moves relatively rearward on the bottom surface of the roller control piece 477 of the control slider 470. In association with this operation, the swing support plate 320 is rotated counterclockwise when viewed from the right side and the pull-in roller 310 that is supported by its swing end portion is elevated. After a short while, a state is established in which the 12-cm CD 101 is interposed and held between the pull-in roller 310 and the bottom surface of the auxiliary support plate 380 of the centering block 360 (see FIG. 29).

After the 12-cm CD 101 is interposed and held between the pull-in roller 310 and the bottom surface of the auxiliary support plate 380, the pull-in roller 310 that is rotating counterclockwise when viewed from the right side feeds the 12-cm CD 101 forward.

Figure 28:
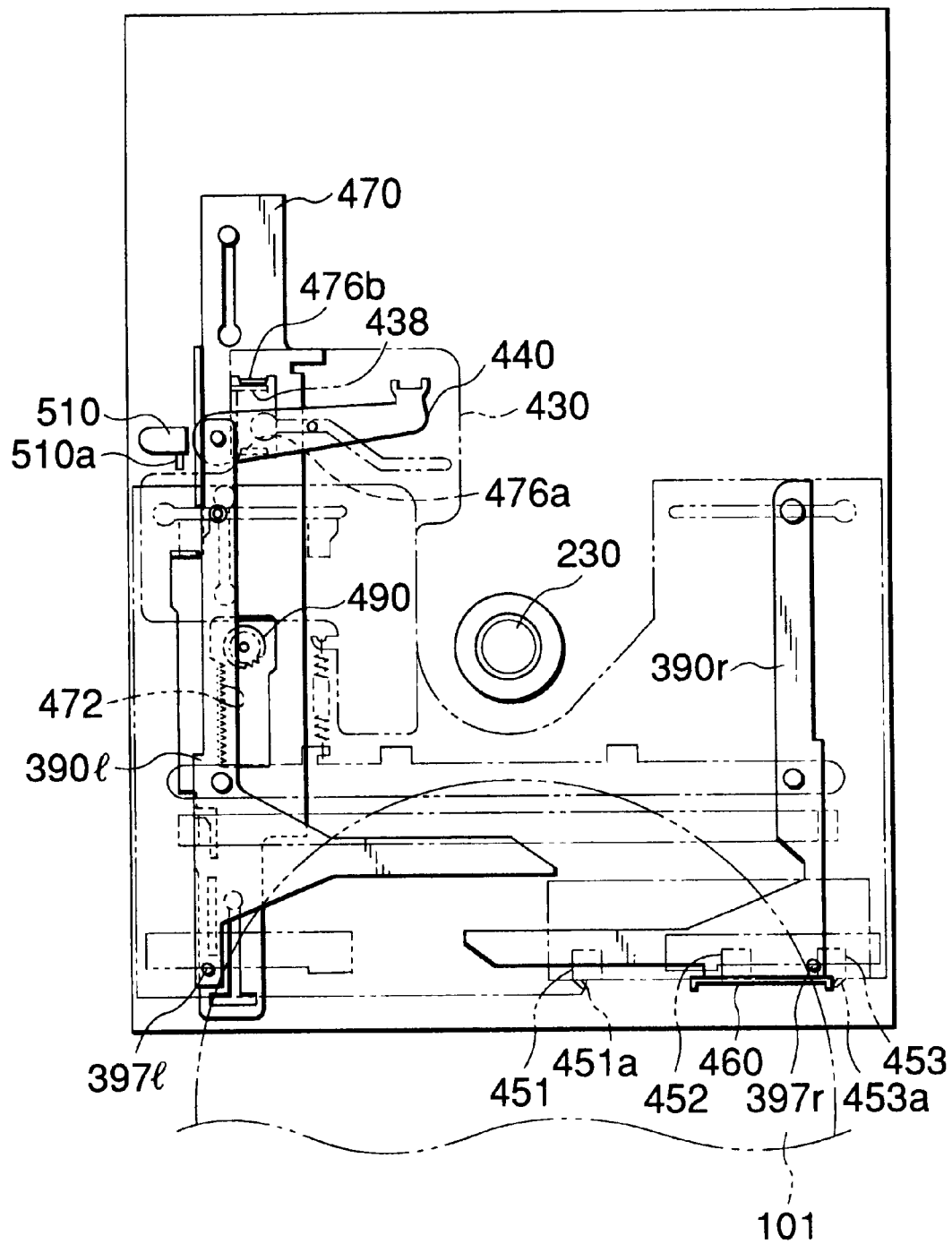
FIG. 28 is a schematic plan view showing a state that the 12-cm CD is ejected.
Figure 29:
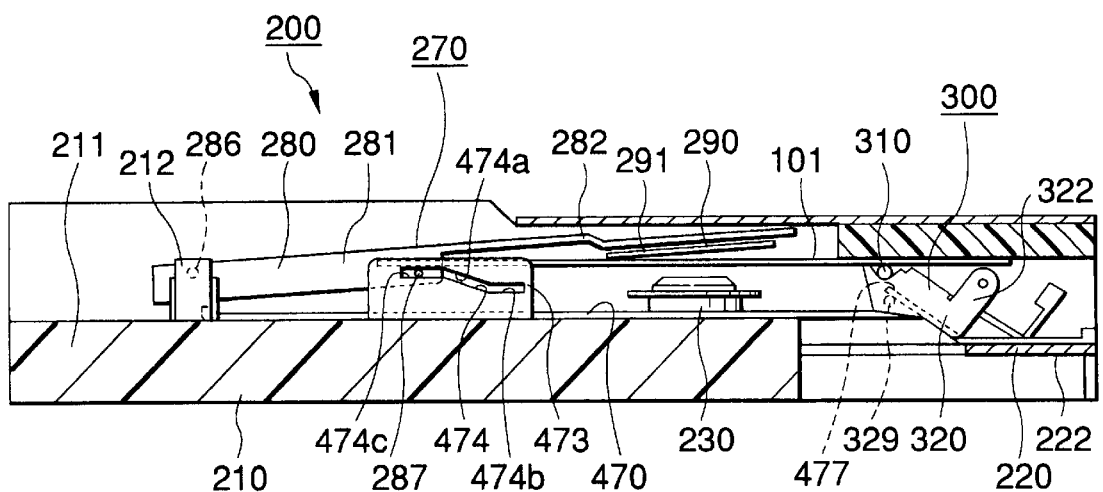
FIG. 29 is a side view of the main part showing a state before the 12-cm CD is chucked.
Figure 40:
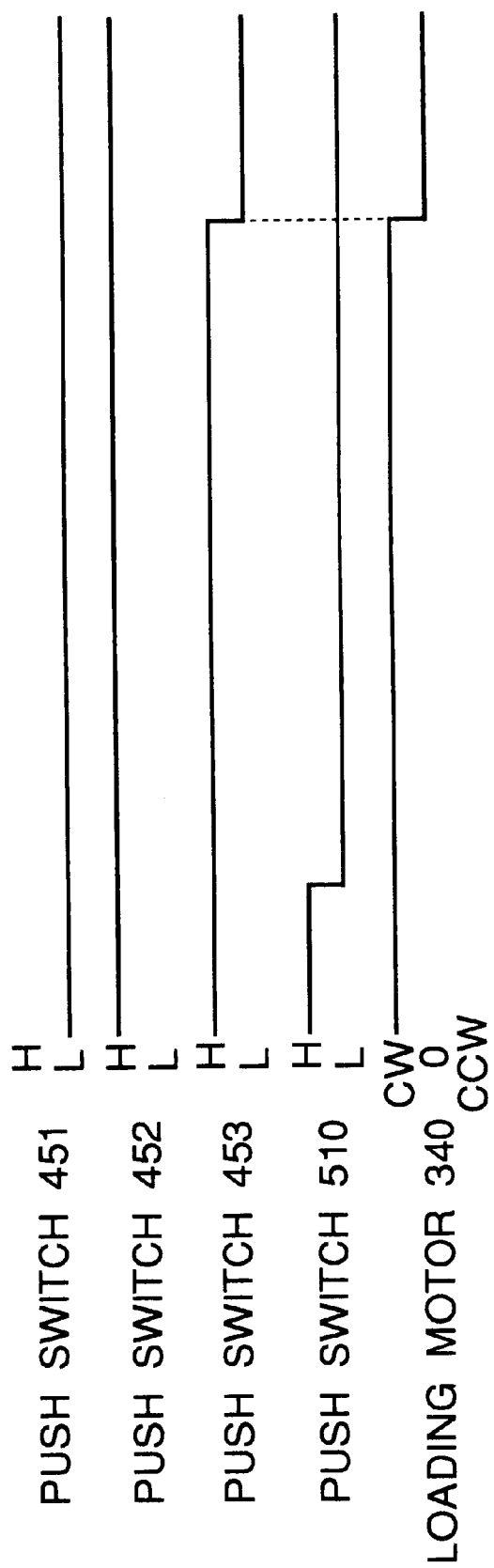
FIG. 40 is a time chart showing output levels of the respective push switches and states of the loading motor during unloading of the 12-cm CD.

After a short while, the right end portion of the switch pressing piece 460 that is provided on the right-hand centering member 390*r* separated leftward from the part 453*a* of the right-hand push switch 453, whereby the output level of the push switch 453 turns to the low level and in turn the driving of the loading motor 340 is stopped (see FIG. 40). In this state, part of the 12-cm CD 101 projects outside from the chassis insertion mouth (not shown) as shown in FIG. 28, and hence it is possible to pull it out by holding its projected part. During this course, the pin 287 to be controlled of the swing base 280 of the chucking mechanism 270 moves relatively rearward along the slant portion 474a of the cam slit 474, whereby the swing base 280 is rotated in such a manner that its swing end portion is elevated. As a result, the chuck plate 290 that is supported by the swing end portion is elevated, to cancel the holding of the 12-cm CD 101 between the chuck plate 290 and the turn table 230.

The 12-cm CD 101 is unloaded in the above manner.

Next, unloading of the 8-cm CD 102 will be described.

If an unloading instruction is made in a state that the 8-cm CD 102 is loaded, for example, if an ejection button provided on a chassis front surface (not shown) is depressed, the loading motor 340 is rotated in the unloading direction (see FIG. 41) and both of the pull-in roller 310 and the pinion gear 490 are thereby rotated in the unloading direction. That is, the pull-in roller 310 is rotated clockwise when viewed from the left side and the pinion gear 490 is rotated counterclockwise when viewed from above.

When the pinion gear 490 rotates in the unloading direction, the control slider 470 whose rack teeth 472 mesh with it is fed forward. As a result, first the front projection 476a of the control slider 470 goes away from the projection 438 of the mode slider 430, and hence the tensile force of the tension coiled spring 433 causes the mode slider 430 to move forward until the piece 442 to be pressed of the judgment lever 440 butts the outer periphery of the 8-cm CD 102. In association with this operation, the centering members 390l and 390r are slightly moved in such directions as to come closer to each other, whereby the four centering shafts 398l, 398r, 399l, and 399r butt the outer periphery of the 8-cm CD 102. During this course, the switch pressing piece 475 of the control slider 470 is separated forward from the part 510a to be pressed of the push switch 510, whereby the output level of the push switch 510 turns to the low level. Since the pull-in roller 310 is separated under the 8-cm CD 102, its rotation does not influence the 8-cm CD 102.

As the control slider 470 further moves forward, the pin 329 to be controlled of the swing support plate 320 of the pull-in roller block 300 moves relatively rearward on the bottom surface of the roller control piece 477 of the control slider 470. In association with this operation, the swing support plate 320 is rotated counterclockwise when viewed from the right side and the pull-in roller 310 that is supported by its swing end portion is elevated. After a short while, a state is established in which the 8-cm CD 102 is interposed and held between the pull-in roller 310 and the bottom surface of the auxiliary support plate 380 of the centering block 360.

After the 8-cm CD 102 is interposed and held between the pull-in roller 310 and the bottom surface of the auxiliary support plate 380, the pull-in roller 310 that is rotating counterclockwise when viewed from the right side feeds the 8 -cm CD 102 forward.

Figure 41:
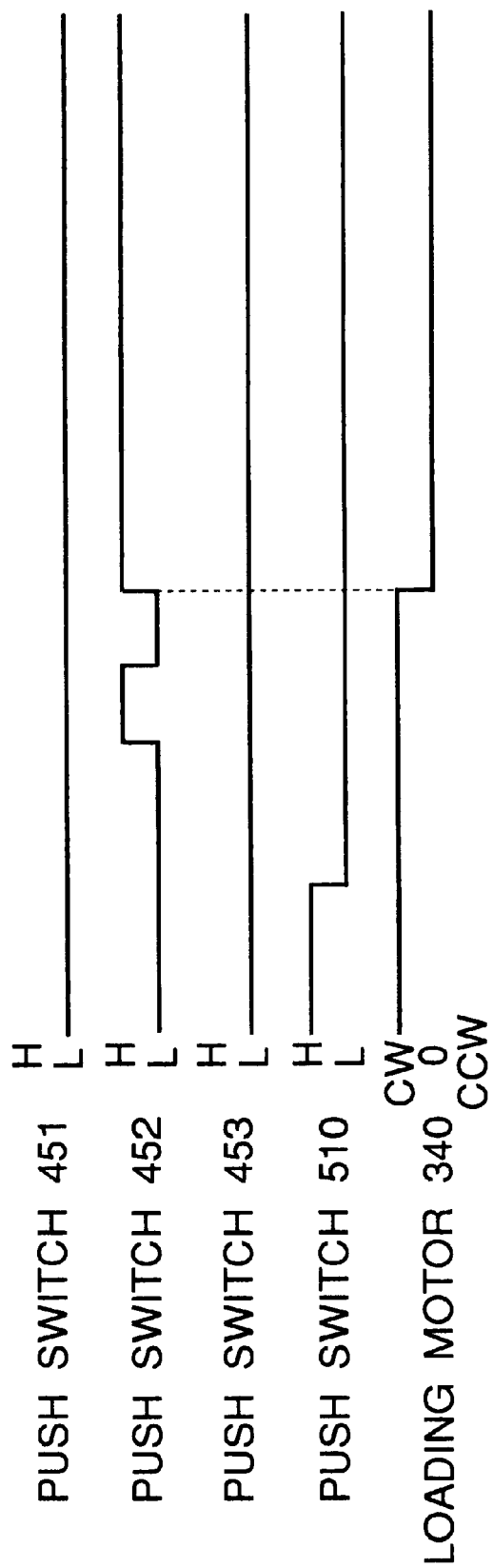
FIG. 41 is a time chart showing output levels of the respective push switches and states of the loading motor during unloading of the 8-cm CD.

Then, while a portion of the 8-cm CD 102 in the neighborhood of its maximum-diameter portion passes the line connecting the centering shafts a 398l and 398r, the right end portion of the switch pressing piece 460 pushes the part 452a to be pressed of the central push switch 452, whereby the output level of the push switch 452 turns to the high level (see FIG. 41). After the portion of the 8-cm CD 102 in the neighborhood of its maximum-diameter portion passes the line connecting the centering shafts 398l and 398r, the right end portion of the switch pressing piece 460 escapes leftward from the part 452a to be pressed of the push switch 452, whereby the output level of the push switch 452 turns to the low level (see FIG. 41). Immediately thereafter, the maximum-diameter portion of the 8-cm CD 102 reaches the position corresponding to the insertion detecting pins 397l and 397r, and the right end portion of the switch pressing piece 460 again pushes the part 452a to be pressed of the push switch 452, whereby the output level of the push switch 452 turns to the high level (see FIG. 41). This rise in the output level of the push switch 452 causes the driving of the loading motor 340 to be stopped (see FIG. 49).

Figure 37:
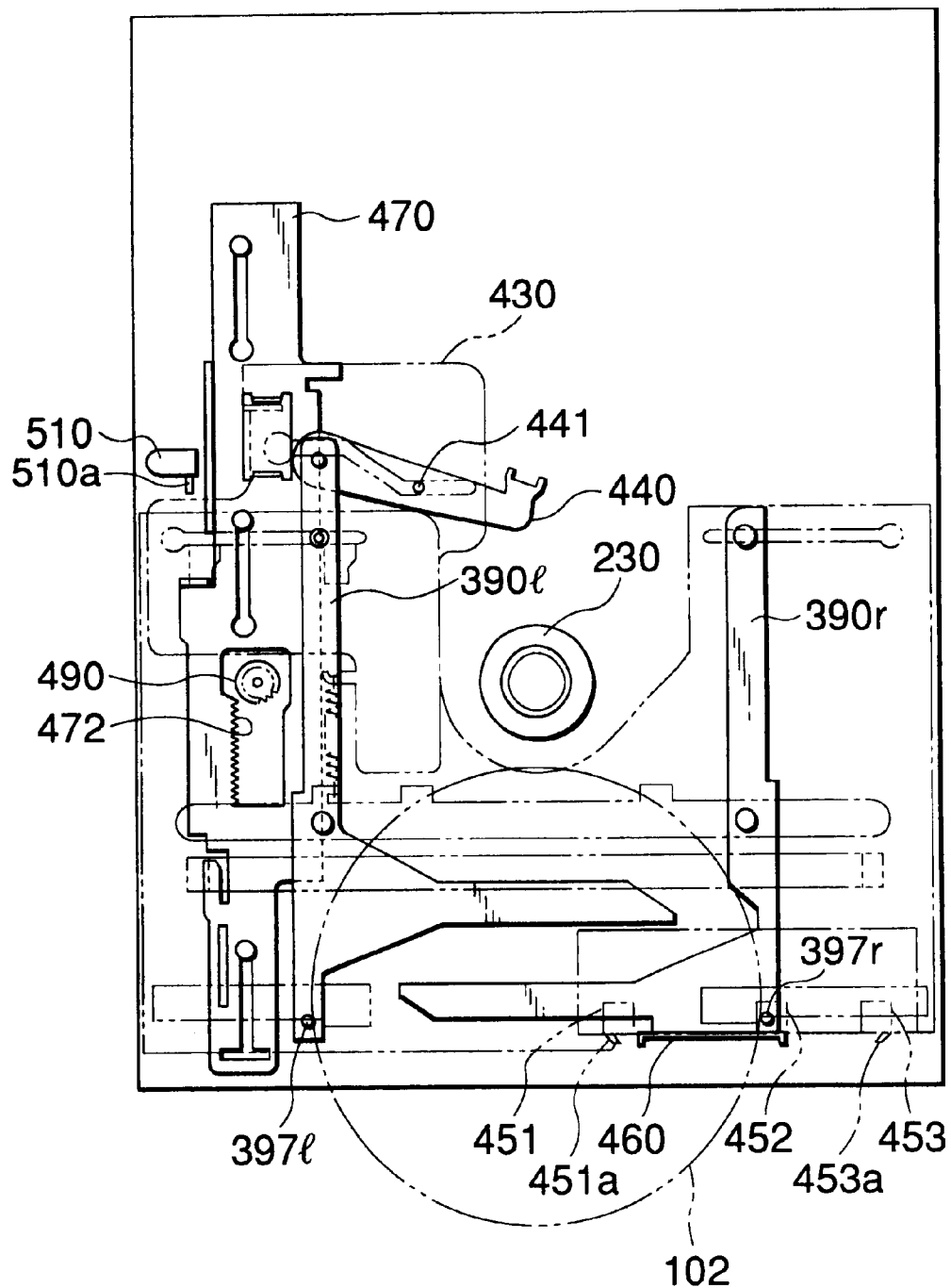
FIG. 37 is a schematic plan view showing a state that the 8-cm CD is ejected.
Figure 38:
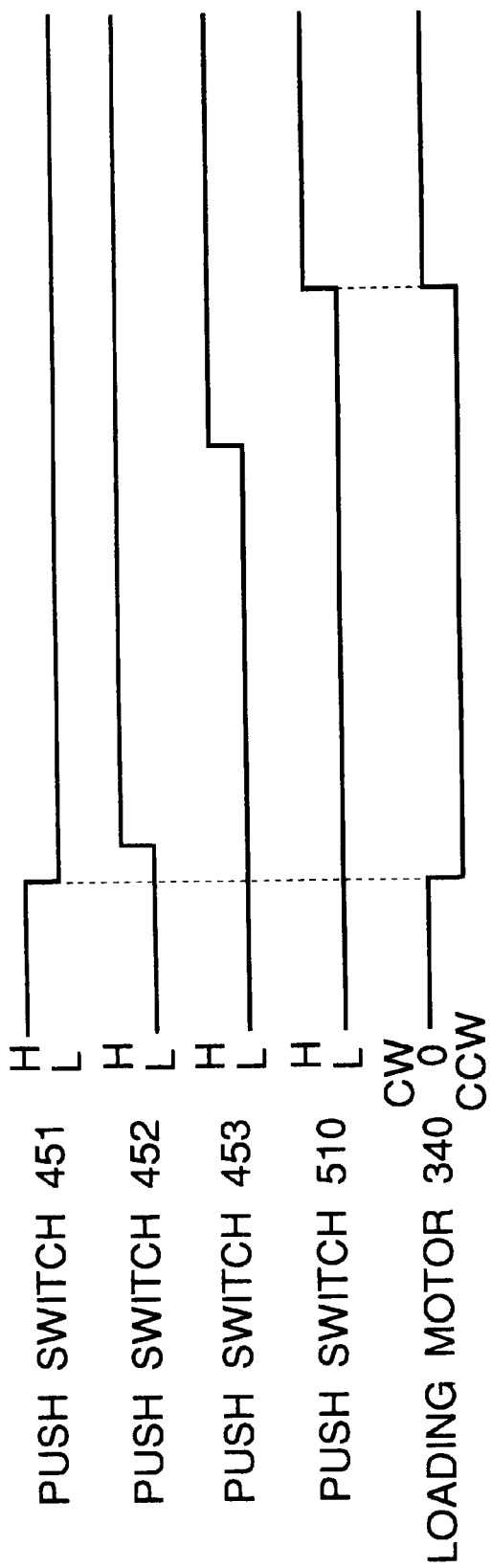
FIG. 38 is a time chart showing output levels of the respective push switches and states of a loading motor during loading of the 12-cm CD.

In this state, part of the 8-cm CD 102 projects outside from the chassis insertion mouth (not shown), and hence it is possible to pull it out by holding its projected part (see FIG. 37). During this course, the pin 287 to be controlled of the swing base 280 of the chucking mechanism 270 moves relatively rearward along the slant portion 474a of the cam slit 474, whereby the swing base 280 is rotated in such a manner that its swing end portion is elevated. As a result, the chuck plate 290 that is supported by the swing end portion is elevated, to cancel the holding of the 8-cm CD 102 between the chuck plate 290 and the turn table 230.

The 8-cm CD 102 is unloaded in the above manner.

Should unloading become impossible due to an unexpected accident such as a stop of power supply in a state that the 12-cm CD 101 or the 8-cm CD 102 is left loaded, it can forcibly be unloaded by pushing the above-mentioned manual ejection lever 520 inward. That is, when the manual ejection lever 520 is pushed inward, its rack teeth 521 rotate the pinion gear 490 as well as the pull-in roller 310 in the unloading direction. Therefore, the 12-cm CD 101 or the 8-cm CD 102 can be moved forward to such a position as to allow the user to pull it out by holding it by hand.

As described above, in the above CD player 200, since the 12-cm CD 101 or the 8-cm CD 102 is centered by causing the two pairs of, i.e., four, centering shafts 398l, 398r, 399l, and 399r to butt its outer periphery, the centering is effected with high accuracy. Further, the disc 101 or 102 can be centered in a reliable manner even in a case where it is used in a vertical installation state.

In the disc centering mechanism in the disc playback and/or recording apparatus according to the invention, since the disc is centered by causing the two pairs of, i.e., four, centering shafts to butt its outer periphery, the centering can be effected with high accuracy. Further, even where the disc is used in a vertical installation state, it can be centered in a reliable manner.

There are provided two centering members that each support two of the centering shafts and are movable in directions perpendicular to the pull-in direction of the disc and parallel with the recording surface of the disc, resilient means for providing moving force that causes the centering members to come closer to each other, and synchronizing means for restricting the centering members so that they move in synchronism with each other in opposite directions. Since the two pairs of, i.e., four, centering shafts move in synchronism with each other in opposite directions with respect to a center line that is perpendicular to the pull-in direction of the disc, the disc can be centered with higher accuracy.

The synchronizing means is constituted of the racks provided on the respective centering members so as to extend in moving directions thereof and the pinion bear that mesh with both of the two racks. Therefore, means that causes the two centering members in synchronism with each other in opposite directions can be formed easily, and the above-mentioned synchronized movements can be made more accurate.

The specific shapes and structures of the respective parts that are shown in the above embodiment are just embodying examples in practicing the invention, and the technical scope of the invention should not be construed in a restrictive manner by those specific shapes and structures.

What is claimed is:

1. A disc playback and/or recording apparatus comprising:
   disc centering means for centering a disc pulled into said apparatus, said disc centering means including:
      first and second centering members capable of moving in mirror image synchronism with each other so as to move in opposite directions which are perpendicular to a pull-in direction of a disc and which are parallel with a recording surface of the disc;
      a first front centering shaft and a first rear centering shaft supported on and attached to said first centering member so that said first rear centering shaft is located directly behind said first front centering shaft in a straight line along a central longitudinal axis of said first centering member, said first front and rear centering shafts both being uniform diameter cylinders which act only to contact an outer periphery of the disc to guide and center the disc;
      a second front centering shaft and a second rear centering shaft supported on and attached to said second centering member so that said second rear centering shaft is located directly behind said second front centering shaft in a straight line along a central longitudinal axis of said second centering member, said second front and rear centering shafts both being uniform diameter cylinders which act only to contact an outer periphery of the disc to guide and center the disc, but do not pinch or grab the disc;
      a driving mechanism for centering the disc by causing the outer periphery of the disc to non-pinchingly contact said first front and rear and second front and rear centering shafts;
      a pull-in roller for driving the disc in the pull-in direction; and
      a control mechanism for driving said pull-in roller to move the disc in the pull-in direction and driving said first and second centering shafts to release said first front and rear and second front and rear centering shafts from contact with the outer periphery of the disc that is centered, wherein said control mechanism has a motor for driving said pull-in roller and said first front and rear and second front and rear centering shafts.

2. The apparatus according to claim 1, wherein said disc centering means further comprises:
   a resilient member for providing moving force that causes said first and second centering members to come closer to each other; and
   synchronizing means for restricting said first and second centering members so that said first and second centering members move in mirror image synchronism with respect to each other in said opposite directions.

3. The apparatus according to claim 2, wherein said synchronizing means comprises a pinion gear and first and second racks, said first and second racks being provided on said first and second centering members, respectively, so that said first rack is attached to said first centering member and extends towards said second centering member and said second rack is attached to said second centering member and extends towards said first centering member, and said pinion gear is located between said first and second racks to mesh with both of said first and second racks simultaneously.

4. The apparatus according to claim 1, wherein said disc centering means further comprises first and second positioning members for positioning said first and second centering members, respectively, in a direction perpendicular to the pull-in direction.

5. The apparatus according to claim 4, wherein said first and second positioning members comprise a lock mechanism for preventing said first and second centering members from moving away from each other, and for canceling locking of said first and second centering members by when said lock mechanism is pushed by the outer periphery of the disc.

6. The apparatus according to claim 4, wherein said first and second positioning members are rotatably mounted on said first and second centering members, respectively.

7. The apparatus according to claim 1, wherein said disc centering means further comprises a detection lever driven by being pushed by the outer periphery of the disc being pulled in, said detection lever being for detecting a size of the disc, and wherein said control mechanism drives a chucking mechanism, in association with driving of said detection lever, to hold a central position of the disc that is centered.

8. The apparatus according to claim 1, wherein said control mechanism separates said pull-in roller from the disc that is centered.

9. The apparatus according to claim 8, wherein said disc centering means further comprises:
   a plurality of detection switches that are selectively operated as said first and second centering members move; and
   a controller for controlling, in accordance with outputs of each of said plurality of detection switches, an outside projection length of the disc from said apparatus when the disc is ejected by said pull-in roller.

10. The apparatus according to claim 8, wherein said control mechanism comprises a slider and a motor both for driving said slider so as to slide said slider and for rotationally driving said pull-in roller, and wherein as said slider moves, said pull-in roller separates from the disc.

11. A disc playback and/or recording apparatus comprising:
    disc centering means for centering a disc pulled into said apparatus, said disc centering means including:
       first and second centering members capable of moving in mirror image synchronism with each other so as to move in opposite directions which are perpendicular to a pull-in direction of a disc and parallel with a recording surface of the disc;
       a first front centering shaft and a first rear centering shaft supported on said first centering member;
       a second front centering shaft and a second rear centering shaft supported on said second centering member;
       a driving mechanism for centering the disc by causing an outer periphery of the disc to non-pinchingly contact said first front and rear and second front and rear centering shafts;
       a pull-in roller rotating in both clockwise and counterclockwise directions for driving the disc in the pull-in direction and a direction opposite of the pull-in direction when a rotating surface of said pull-in roller contacts the recording surface of the disc so as to pull the disc into said apparatus and eject the disc from said apparatus, respectively, said pull-in roller being located so that both a length and a central longitudinal axis thereof are perpendicular to both the pull-in direction of the disc and to said central longitudinal axes of said first and second centering members; and a control mechanism for driving said driving mechanism so that said first front and rear and second front and rear centering shafts move to contact and to release contact with the disc, wherein said control mechanism has a motor for driving said driving mechanism.

12. A disc playback and/or recording apparatus comprising:

disc centerer configured to center a disc pulled into said apparatus, said disc centerer including:

first and second centering members movable in mirror image synchronism with each other so as to move in opposite directions which are perpendicular to a pull-in direction of a disc and which are parallel with a recording surface of the disc;

a first front centering shaft and a first rear centering shaft supported on and attached to said first centering member so that said first rear centering shaft is located directly behind said first front centering shaft in a straight line along a central longitudinal axis of said first centering member, said first front and rear centering shafts both being uniform diameter cylinders which act only to contact an outer periphery of the disc to guide and center the disc;

a second front centering shaft and a second rear centering shaft supported on and attached to said second centering member so that said second rear centering shaft is located directly behind said second front centering shaft in a straight line along a central longitudinal axis of said second centering member, said second front and rear centering shafts both being uniform diameter cylinders which act only to contact an outer periphery of the disc to guide and center the disc, but do not pinch or grab the disc;

a drive configured to drive the disc to center the disc by causing the outer periphery of the disc to non-pinchingly contact said first front and rear and second front and rear centering shafts;

a pull-in roller for pulling the disc inside of the apparatus in the pull-in direction; and a first controller both configured to control said pull-in roller to move the disc in the pull-in direction and to control said first and second centering shafts to release said first front and rear and second front and rear centering shafts from contact with the outer periphery of the disc that is centered, wherein said first controller has a motor configured to drive said pull-in roller and said first front and rear and second front and rear centering shafts.

13. The apparatus according to claim 12, wherein said disc centerer further comprises:

a resilient member configured to provide a moving force that causes said first and second centering members to come closer to each other; and synchronizer configured to restrict said first and second centering members so that said first and second centering members move in mirror image synchronism with respect to each other in said opposite directions.

14. The apparatus according to claim 13, wherein said synchronizer comprises a pinion gear and first and second racks, said first and second racks being provided on said first and second centering members, respectively, so that said first rack is attached to said first centering member and extends towards said second centering member and said second rack is attached to said second centering member and extends towards said first centering member, and said pinion gear is located between said first and second racks to mesh with both of said first and second racks simultaneously.

15. The apparatus according to claim 12, wherein said disc centerer further comprises first and second positioners configured to position said first and second centering members, respectively, in a direction perpendicular to the pull-in direction.

16. The apparatus according to claim 15, wherein said first and second positioners comprise a lock mechanism configured to both prevent said first and second centering members from moving away from each other, and to cancel locking of said first and second centering members when said lock mechanism is pushed by the outer periphery of the disc.

17. The apparatus according to claim 15, wherein said first and second positioners are rotatably mounted on said first and second centering members, respectively.

18. The apparatus according to claim 12, wherein said disc centerer further comprises a detection lever driven by being pushed by the outer periphery of the disc being pulled in, said detection lever being configured to detect a size of the disc, and wherein said first controller drives a chucking mechanism, in association with driving of said detection lever, to hold a central position of the disc that is centered.

19. The apparatus according to claim 12, wherein said first controller separates said pull-in roller from the disc that is centered.

20. The apparatus according to claim 19, wherein said disc centerer further comprises:

a plurality of detection switches that are selectively operated as said first and second centering members move; and a second controller configured to control, in accordance with outputs of each of said plurality of detection switches, an outside projection length of the disc from said apparatus when the disc is ejected by said pull-in roller.

21. The apparatus according to claim 19, wherein said second controller comprises a slider and a motor, said motor being configured to both drive said slider so as to slide said slider and to rotationally drive said pull-in roller, and wherein as said slider moves, said pull-in roller separates from the disc.

22. A disc playback and/or recording apparatus comprising:

disc centerer configures to center a disc pulled into said apparatus, said disc centerer including:

first and second centering members configured to move in mirror image synchronism with each other so as to move in opposite directions which are perpendicular to a pull-in direction of a disc and which are parallel with a recording surface of the disc;

a first front centering shaft and a first rear centering shaft supported on said first centering member;

a second front centering shaft and a second rear centering shaft supported on said second centering member;

a driver configured to center the disc by causing an outer periphery of the disc to non-pinchingly contact said first front and rear and second front and rear centering shafts;

a pull-in roller configured to rotate in both clockwise and counterclockwise directions to drive the disc in the pull-in direction and a direction opposite of the pull-in direction when a rotating surface of said pull-in roller contacts the recording surface of the disc so as to pull the disc into said apparatus and eject the disc from said apparatus, respectively, said pull-in roller being located so that both a length and a central longitudinal axis thereof are perpendicular to both the pull-in direction of the disc and to said central longitudinal axes of said first and second centering members; and a first controller configured to drive said driver so that said first front and rear and second front and rear centering shafts move to contact and to release contact with the disc, wherein said first controller has a motor for driving said driver.

* * * * *

UNITED STATES PATENT AND TRADEMARK OFFICE
CERTIFICATE OF CORRECTION

PATENT NO.    : 6,445,665 B2
DATED         : September 3, 2002
INVENTOR(S)   : Yuichi Yabushita et al.

It is certified that error appears in the above-identified patent and that said Letters Patent is hereby corrected as shown below:

Column 10,
Line 60, change "436c" should read -- 435c --.

Column 16,
Line 1, change "390C" should read -- 390$\ell$ --.

Column 17,
Line 52, change "436c" to -- 435c --.

Signed and Sealed this

Eleventh Day of March, 2003

JAMES E. ROGAN
*Director of the United States Patent and Trademark Office*